US012800805B2

(12) United States Patent
Sousa et al.

(10) Patent No.: US 12,800,805 B2
(45) Date of Patent: Nov. 17, 2026

(54) OPTICAL FILMS AND STACKS INCLUDING OPTICALLY DIFFUSIVE LAYER

(71) Applicant: 3M INNOVATIVE PROPERTIES COMPANY, St. Paul, MN (US)

(72) Inventors: Matthew E. Sousa, Rosemount, MN (US); Matthew S. Cole, Woodbury, MN (US); Jeremy O. Swanson, Woodbury, MN (US); Bharat R. Acharya, Woodbury, MN (US); Jason S. Petaja, Hudson, WI (US); Anthony M. Renstrom, Forest Lake, MN (US); Tri D. Pham, Woodbury, MN (US); David A. Rosen, North Saint Paul, MN (US); Qunyi Chen, Woodbury, MN (US); Lisa A. DeNicola, St. Paul, MN (US); Quinn D. Sanford, Mosinee, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 931 days.

(21) Appl. No.: 17/996,511

(22) PCT Filed: Apr. 20, 2021

(86) PCT No.: PCT/IB2021/053260
§ 371 (c)(1),
(2) Date: Oct. 19, 2022

(87) PCT Pub. No.: WO2021/224703
PCT Pub. Date: Nov. 11, 2021

(65) Prior Publication Data

US 2023/0228919 A1 Jul. 20, 2023

Related U.S. Application Data

(60) Provisional application No. 63/021,751, filed on May 8, 2020.

(51) Int. Cl.
*G02B 5/02* (2006.01)
*G02B 1/04* (2006.01)
*G02B 27/00* (2006.01)

(52) U.S. Cl.
CPC ............ *G02B 5/0242* (2013.01); *G02B 1/04* (2013.01); *G02B 27/0093* (2013.01); *G02B 2207/101* (2013.01)

(58) Field of Classification Search
CPC .... G02B 5/0242; G02B 1/04; G02B 27/0093; G02B 2207/101; G06V 40/12
(Continued)

(56) References Cited

U.S. PATENT DOCUMENTS 5,882,774 A 3/1999 Jonza et al.
6,179,948 B1 1/2001 Merrill et al.
(Continued)

FOREIGN PATENT DOCUMENTS

JP 2010072616 A 4/2010
WO 2017110939 A1 6/2017
(Continued)

OTHER PUBLICATIONS

International Search Report for PCT Application No. PCT/IB2021/053260, mailed on Jun. 22, 2021, 3 pages.

*Primary Examiner* — William R Alexander
*Assistant Examiner* — Mackenzi Bourquine
(74) *Attorney, Agent, or Firm* — Clifton F. Richardson; Theresa Stadheim

(57) ABSTRACT

Optical films and stacks include at least one optically diffusive layer. The optically diffusive layer can include a plurality of nanoparticles and a polymeric material bonding the nanoparticles to each other to form a plurality of nanoparticle aggregates defining a plurality of voids therebetween. For substantially normally incident light and a visible
(Continued)

wavelength range from about 450 nm to about 650 nm and an infrared wavelength range from about 930 nm to about 970 nm: in the visible wavelength range, the optical film or optically diffusive layer has an average specular transmittance Vs; and in the infrared wavelength range, the optical film or optically diffusive layer has an average total transmittance It and an average specular transmittance Is, Is/It≥0.6, Is/Vs≥2.5.

13 Claims, 20 Drawing Sheets

(58) Field of Classification Search
USPC .......................................................... 359/599
See application file for complete search history.

(56) References Cited

U.S. PATENT DOCUMENTS

| | | | | |
|---|---|---|---|---|
| 6,783,349 | B2 | 8/2004 | Neavin et al. | |
| 6,967,778 | B1 | 11/2005 | Wheatley et al. | |
| 9,162,406 | B2 | 10/2015 | Neavin et al. | |
| 9,441,809 | B2 | 9/2016 | Nevitt et al. | |
| 9,551,818 | B2 | 1/2017 | Weber et al. | |
| 2003/0118750 | A1* | 6/2003 | Bourdelais | G02B 5/0242 428/1.3 |
| 2003/0123150 | A1* | 7/2003 | Brickey | G02B 5/0242 359/599 |
| 2011/0100423 | A1* | 5/2011 | Fortmann | H02S 10/30 136/246 |
| 2012/0038990 | A1* | 2/2012 | Hao | G02B 5/0268 428/221 |
| 2012/0200919 | A1* | 8/2012 | Petaja | G02B 5/0242 252/582 |
| 2012/0200931 | A1* | 8/2012 | Haag | G02B 5/0242 521/122 |
| 2013/0186466 | A1* | 7/2013 | Hebrink | C12N 15/113 428/149 |

FOREIGN PATENT DOCUMENTS

| | | | |
|---|---|---|---|
| WO | 2017124664 | A1 | 7/2017 |
| WO | 2021224715 | A1 | 11/2021 |
| WO | 2021224716 | A1 | 11/2021 |
| WO | 2021224735 | A1 | 11/2021 |
| WO | 2021224760 | A1 | 11/2021 |
| WO | 2021224761 | A1 | 11/2021 |
| WO | 2021224782 | A1 | 11/2021 |
| WO | 2021224798 | A1 | 11/2021 |
| WO | 2021224799 | A1 | 11/2021 |

* cited by examiner

OPTICAL FILMS AND STACKS INCLUDING OPTICALLY DIFFUSIVE LAYER

CROSS REFERENCE TO RELATED APPLICATIONS

This application is a national stage filing under 35 U.S.C. 371 of PCT/IB2021/053260, filed Apr. 20, 2021, which claims the benefit of U.S. Application No. 63/021,751, filed May 8, 2020, the disclosures of which are incorporated by reference in their entirety herein.

BACKGROUND

Optical diffusers can be used to diffuse light in a variety of applications. For example, optical diffusers can be used in display applications to reduce hot spots and increase uniformity.

SUMMARY

The present disclosure relates generally to optical films and optical stacks including at least one optically diffusive layer.

In some aspects of the present disclosure, an optical film including an optically diffusive layer is provided. The optically diffusive layer has opposing first and second major surfaces and includes a plurality of nanoparticles dispersed between and across the first and second major surfaces. The optically diffusive layer includes a polymeric material bonding the nanoparticles to each other to form a plurality of nanoparticle aggregates defining a plurality of voids therebetween. The nanoparticles can be or include silica. In a plane of a cross-section of the optically diffusive layer in a thickness direction of the optically diffusive layer: the nanoparticles can have an average size between about 20 nm to about 150 nm; an average size of the nanoparticle aggregates can be between about 100 nm and about 1000 nm; and the voids can occupy between about 15% to about 45% of an area of the plane of the cross-section. For substantially normally incident light and a visible wavelength range from about 450 nm to about 650 nm and an infrared wavelength range from about 930 nm to about 970 nm: in the visible wavelength range, the optical film has an average specular transmittance Vs; and in the infrared wavelength range, the optical film has an average total transmittance It and an average specular transmittance Is. Is/It≥0.6 and Is/Vs≥2.5. Bending the optical film at a first bend location over an inner diameter of at most 10 mm results in no, or very little, damage to the optically diffusive layer at the first bend location.

In some aspects of the present disclosure, an optical stack including a reflective polarizer disposed between first and second optically diffusive layers is provided. Each of the first and second optically diffusive layers include a plurality of non-uniformly dispersed particles defining a plurality of voids therein. For substantially normally incident light and a visible wavelength range from about 450 nm to about 650 nm and an infrared wavelength range from about 930 nm to about 970 nm: the reflective polarizer transmits at least 40% of the incident light for a first polarization state for each wavelength in the visible wavelength range, reflects at least 70% of the incident light for an orthogonal second polarization state for each wavelength in the visible wavelength range, and transmits at least 40% of the incident light for each of the first and second polarization states for each wavelength in the infrared wavelength range; and in the visible wavelength range, each of the first and second optically diffusive layers has an average total transmittance Vt and an average specular transmittance Vs, and in the infrared wavelength range, each of the first and second optically diffusive layers has an average total transmittance It and an average specular transmittance Is. Is/It≥0.6 and Is/Vs≥2.5.

These and other aspects will be apparent from the following detailed description. In no event, however, should this brief summary be construed to limit the claimable subject matter.

DETAILED DESCRIPTION

Figure 1A:
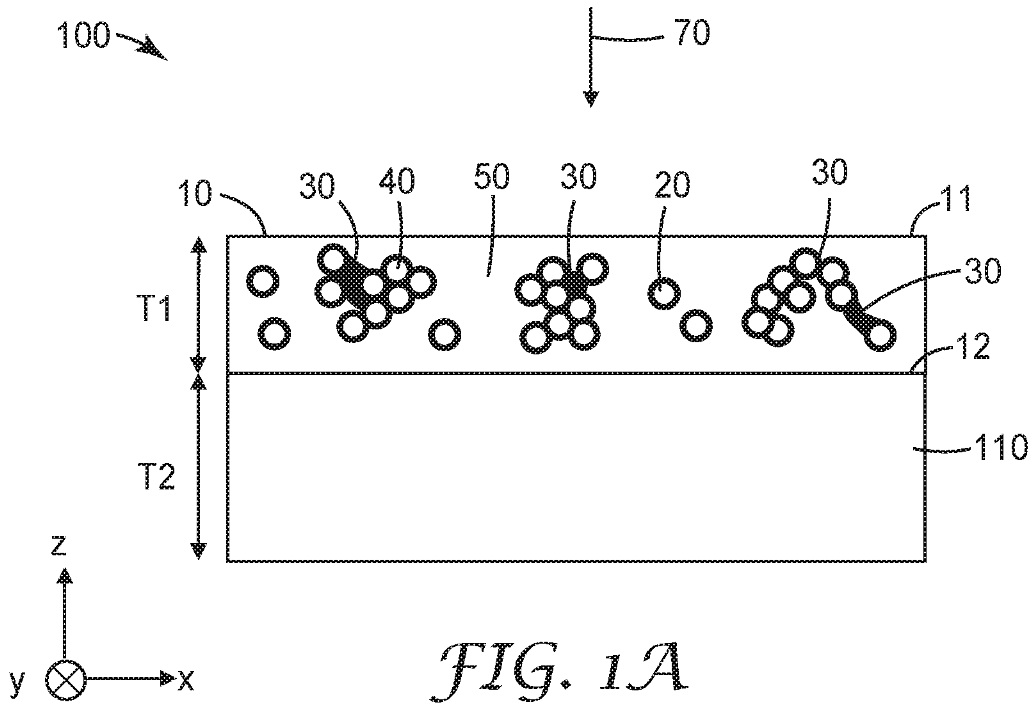
FIG. 1A is a schematic cross-sectional view of an illustrative optical film including an optically diffusive layer.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments, an optical film or optical stack includes at least one optically diffusive layer that includes particles dispersed so as to form aggregates of the particles with voids (air space) between the aggregates. In some embodiments, the optically diffusive layer provides a substantially higher degree of specular transmittance in an infrared range than in a visible range. Alternatively, or in addition, the optically diffusive layer can provide a substantially higher degree of diffuse transmittance in a visible range than in an infrared range, according to some embodiments.

In some embodiments, the particles are nanoparticles and the aggregates have an average size of less than about 1 micron. In other embodiments, the aggregates can be larger (e.g., up to about 10 microns, or from about 1 micron to about 10 microns, or from about 5 microns to about 10 microns). It has been found that an optical film or stack including one or more optically diffusive layers can be flexible and non-fragile even when the aggregates are small (e.g., average size less than about 1 micron) and/or even when the voids occupy a substantial (e.g., about 15% or more) fraction of a cross-section of the optically diffusive layer in a thickness direction (z-axis) of the optically diffusive layer.

According to some embodiments, the optical films or stacks are useful in display applications or other applications where it is desired to provide scattering of visible light (e.g., substantially optically diffuse transmission) with minimum scattering of light in an infrared range (e.g., substantially optically specular transmission). For example, in liquid crystal displays (LCD) that include a fingerprint detection system with an infrared light source and with an infrared sensor behind a backlight, it is typically desired that the infrared light from the infrared light source is transmitted to an outer surface of the display and then, if a finger is present, reflected from the finger and transmitted through the display and through the backlight to the infrared sensor with minimal scattering. LCD backlights also often include optical diffuser(s) for defect hiding, for example. Traditional optical diffusers typically scatter both visible light and light in the wavelength range of the infrared light (e.g., in a wavelength range from about 930 nm to about 970 nm) source making them unsuitable or undesirable for use in the backlight when fingerprint detection is desired. According to some embodiments, the optical films or stacks provide a desired optical diffusion of visible light without substantially scattering the infrared light. The optical films or stacks can be used in one or more of a variety of locations within a backlight. For example, the backlight can include a reflective polarizer for light recycling. In some embodiments, an optical film or stack including a reflective polarizer and an optically diffusive layer disposed on at least one side of the reflective polarizer can be used as the reflective polarizer in the backlight. Alternatively, or in addition, an optical film or stack including at least one optically diffusive layer can be disposed between the reflective polarizer and a lightguide plate of the backlight, for example. Alternatively, or in addition, an optical film including an optical mirror and an optically diffusive layer facing the LCD panel can be used as the back reflector of the backlight. Alternatively, or in addition, an optical film including an absorbing polarizer and an optically diffusive layer facing the backlight can be used as the absorbing polarizer of the LCD panel, for example.

Figure 1B:
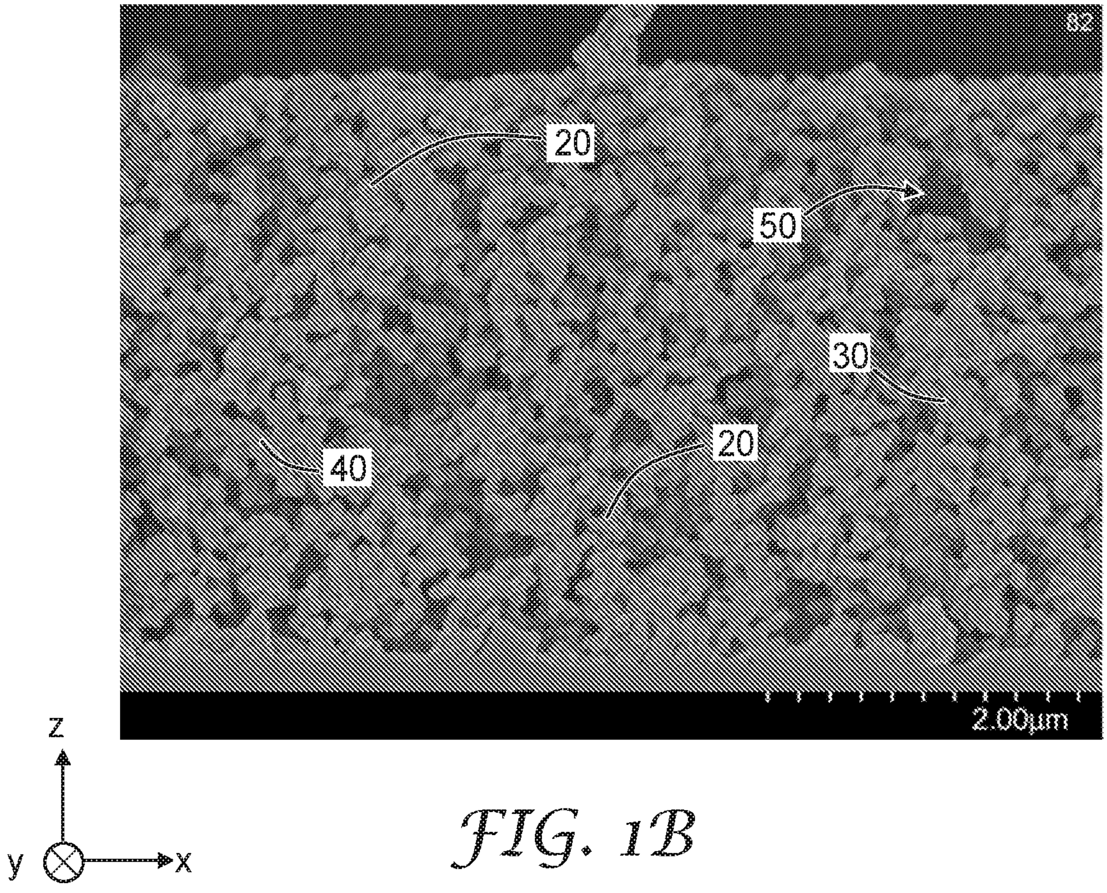
FIGS. 1B-1C are scanning electron microscope (SEM) images of exemplary optically diffusive layers.
Figure 1C:
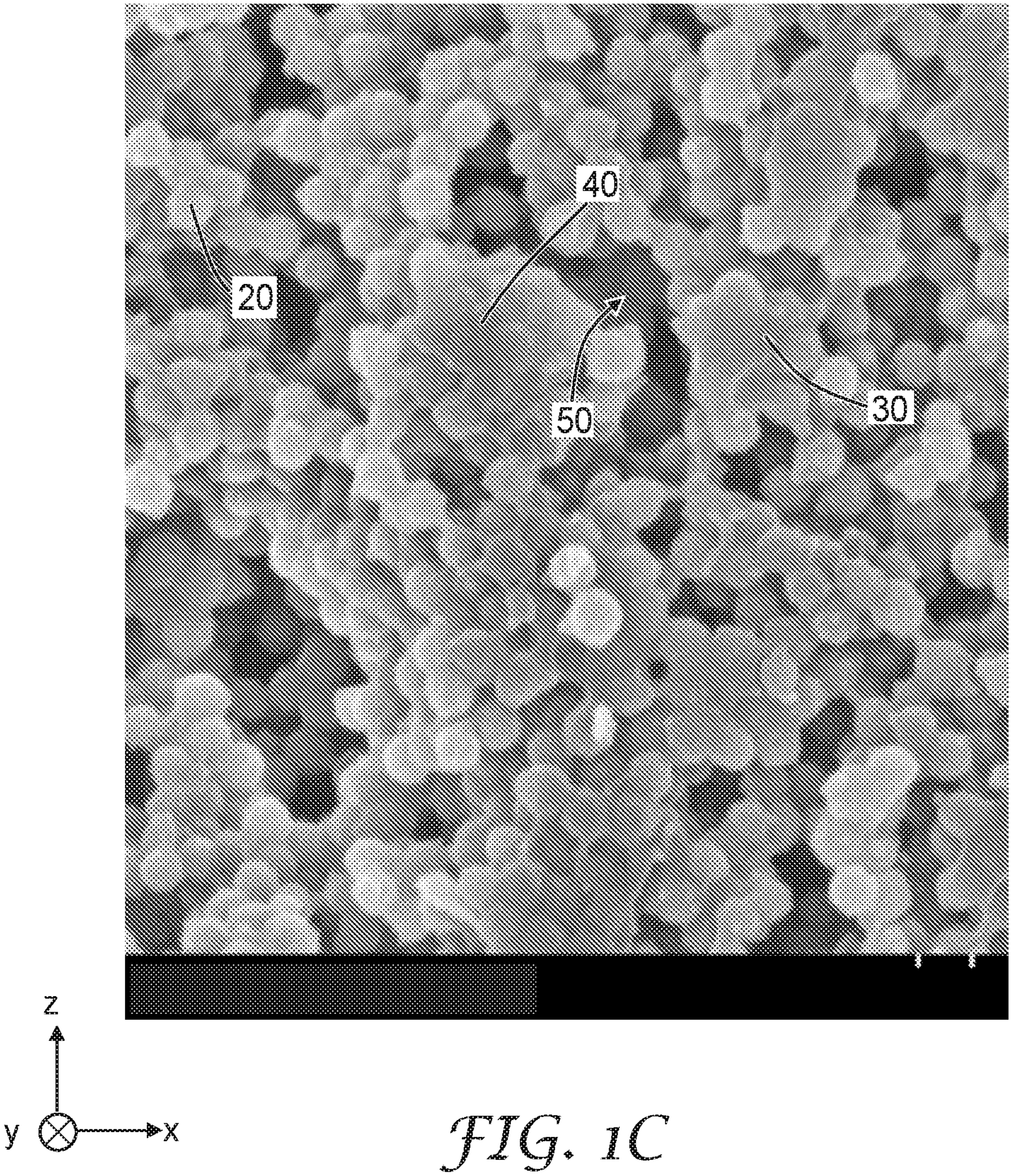
Figure 2:
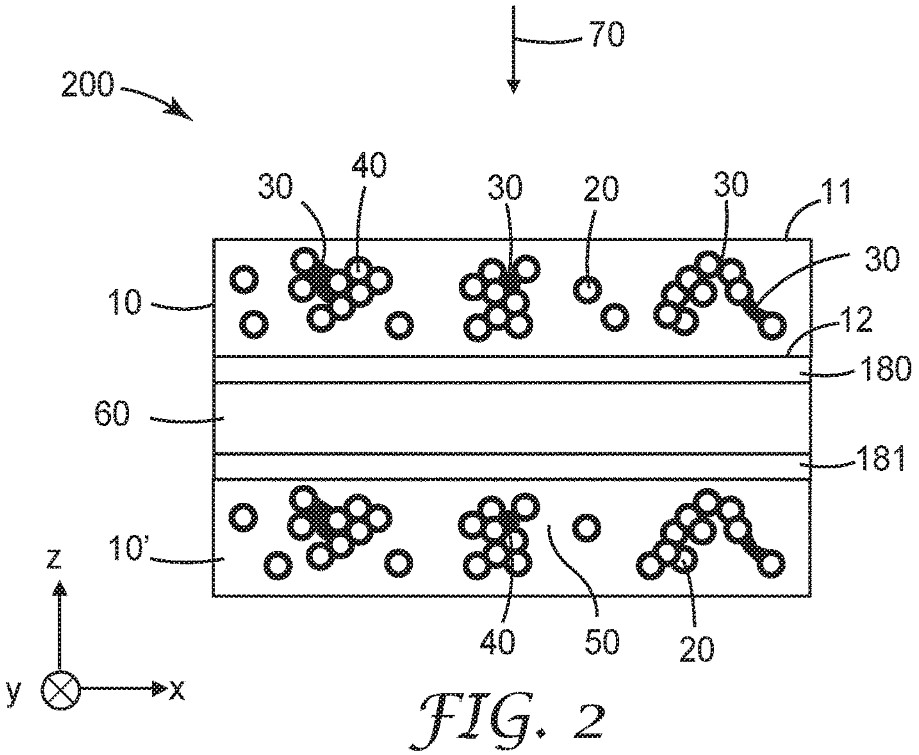
FIGS. 2-3 are schematic cross-sectional views of illustrative optical stacks including optically diffusive layers.
Figure 3:
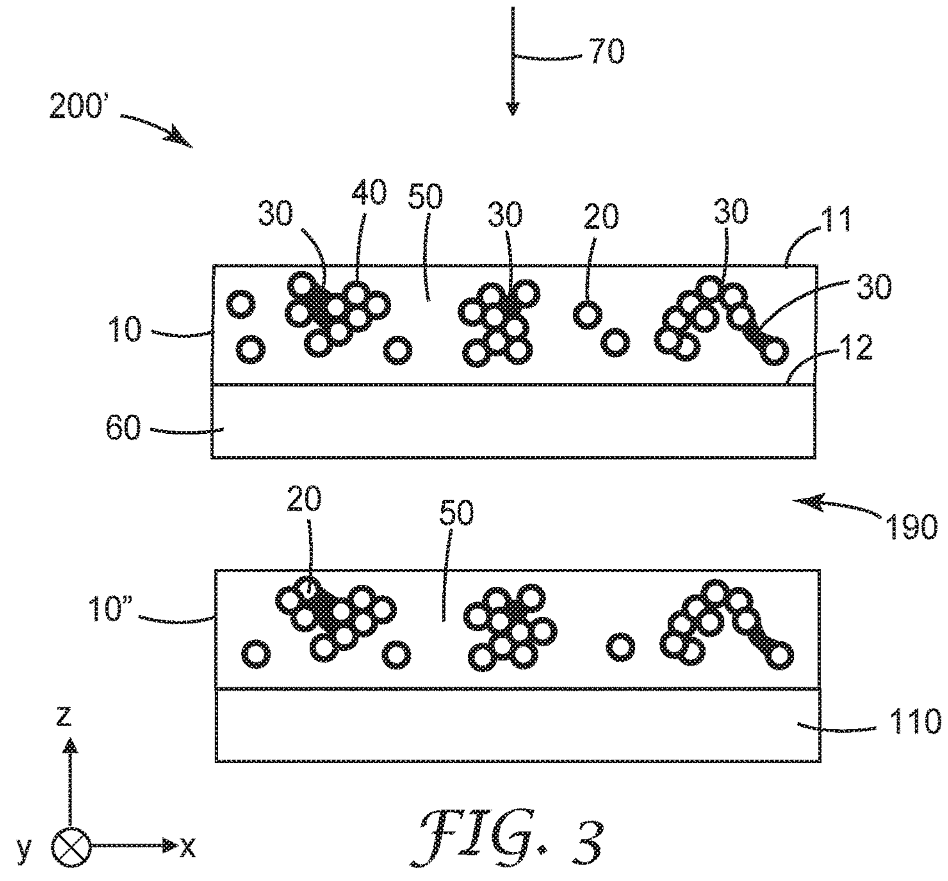
Figure 8:
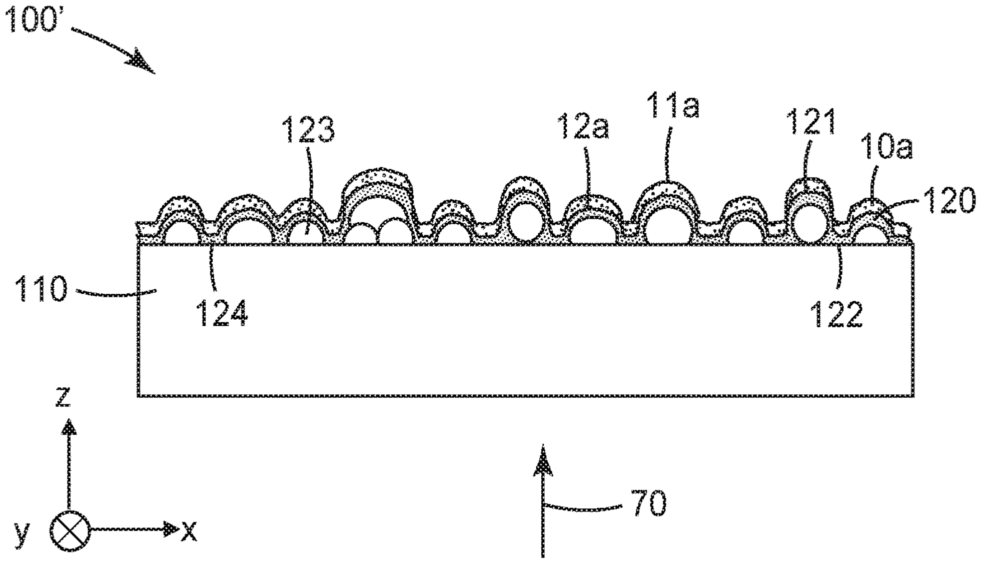
FIG. 8 is a schematic cross-sectional view of an illustrative optical film including an optically diffusive layer disposed on a structured surface.

FIG. 1A is a schematic cross-sectional view of an optical film 100 including an optically diffusive layer 10, according to some embodiments. FIGS. 1B-1C are scanning electron microscope (SEM) images of exemplary optically diffusive layers. FIGS. 2-3 are schematic cross-sectional views of illustrative optical stacks 200 and 200' each including a first optically diffusive layer 10 and a second optically diffuse layer 10' or 10", according to some embodiments. Optical properties of the optical film 100, and/or the optical stacks 200 or 200', and/or the optically diffusive layers 10, 10', or 10" may be described in terms of average specular, diffuse, and/or total transmission for substantially normally incident (e.g., nominally normally incident or within 30 degrees, or within 20 degrees, or 10 degrees of a normal (z-direction) to the x-y plane when the optical film extends in the x-y plane and has a thickness in the z-direction) light 70 in one or more wavelength ranges. The optically diffusive layers 10' and 10" may be generally as described for the optically diffusive layer 10 and may have similar or different transmission properties. The light 70 can be incident on the optically diffusive layer 10 (light propagating in −z direction) as schematically illustrated in FIG. 1A, for example, or the light 70 can be incident on the substrate 110 (light propagating in +z direction) as schematically illustrated in FIG. 8, for example, or the light 70 can be incident on the optically diffusive layer 10'. Similarly, incident light depicted in other figures can be incident from either side of the depicted optical element.

In the embodiment illustrated in FIG. 1A, the optical film 100 includes a substrate 110 disposed on the optically diffusive layer 10. The substrate 110 can be or include one or more of a polymeric layer, a reflective polarizer, an absorbing polarizer, or an optical mirror, for example. In the embodiment illustrated in FIG. 2, the optical stack 200 includes a layer or film 60 bonded to the first and second optically diffusive layers 10 and 10'. In the embodiment illustrated in FIG. 3, the optically diffuse layer 10 is disposed on the layer or film 60 and an air gap 190 separates the optically diffusive layer 10" from the layer or film 60. The optically diffusive layer 10" may be disposed on a substrate 110. The layer or film 60 can be or include one or more of a polymeric layer, a reflective polarizer, an absorbing polarizer, or an optical mirror, for example. In some embodiments of the optical stack 200', the layer or film 60 is a reflective polarizer and the substrate 110 is a polymeric layer.

In some embodiments, an optical stack 200, 200' includes a reflective polarizer 60 disposed between first (10) and second (10', 10") optically diffusive layers, where each of the first and second optically diffusive layers include a plurality of non-uniformly dispersed particles 20 defining a plurality of voids 50 therein. In some embodiments, as schematically illustrated in FIG. 2, each of the first and second optically diffusive layers 10 and 10' is bonded to a reflective polarizer 60 via an adhesive layer 180 and 181, respectively. In some embodiments, the each of the first and second optically diffusive layers 10 and 10' is directly coated on the reflective polarizer 60 without the adhesive layers 180 and 181. In some embodiments, as schematically illustrated in FIG. 3, one (e.g., 10) of the first and second optically diffusive layers is directly coated on the reflective polarizer 60, and the reflective polarizer 60 and the other one (e.g., 10") of the first and second optically diffusive layers define an air gap 190 therebetween.

In some embodiments, the substrate 110 includes one or more of polyethylene terephthalate (PET), polycarbonate, polymethylmethacrylate (PMMA), polyvinyl chloride (PVC), polyvinyl alcohol (PVA), polyolefin, polyethylene, polyethylene naphthalate, cellulose acetate, polystyrene, and polyimide. In some embodiments, the substrate 110 includes alternating first and second layers. The first layer can be or include one of these materials and the second layer can be or include a different one of these materials, for example. In some embodiments, the alternating layers can be a reflective polarizer or an optical mirror, for example. In some embodiments, the substrate 110 includes an absorbing polarizer.

In some embodiments, optically diffusive layer 10, 10' and/or 10" has an average thickness T1 between about 0.1 microns and about 20 microns, or between about 1 microns and about 20 microns, or between about 1.5 microns and about 10 microns, or between about 2 microns and about 8 microns.

In some embodiments, the substrate 110 has an average thickness T2 between about 20 microns and 500 microns, or between about 20 microns and 300 microns, or between about 20 microns and 200 microns, or between about 20 microns and 100 microns.

The optically diffusive layer 10 has opposing first and second major surfaces 11 and 12 and includes a plurality of particles 20 dispersed between and across the first and second major surfaces 11 and 12. The optically diffusive layer 10 includes a polymeric material 30 bonding the particles to each other to form a plurality of particle aggregates 40 defining a plurality of voids 50 therebetween. The optically diffusive layer 10' and/or 10" may be described similarly. In some embodiments, the plurality of particles 20 is a plurality of nanoparticles and the plurality of particle aggregates 40 is a plurality of nanoparticle aggregates. In some embodiments, the particles 20 are or include silica. For example, the particles 20 can be silica nanoparticles.

In some embodiments, in a plane (e.g., the x-z-plane refereeing to the x-y-z coordinate system of FIG. 1) of a cross-section of the optically diffusive layer in a thickness direction (z-direction) of the optically diffusive layer: the nanoparticles 20 have an average size between about 10 nm and 150 nm or between about 20 nm and about 150 nm; an average size of the nanoparticle aggregates 40 is between about 100 nm and about 1000 nm; and the voids 50 occupy from about 5% to about 50% of an area of the plane of the cross-section. In other embodiments, the aggregates 40 can be larger than 1000 nm. In some embodiments, in the plane of the cross-section of the optically diffusive layer in the thickness direction of the optically diffusive layer, the voids occupy from about 5% or about 10% or about 15% to about 50% or about 45% or about 40% of the area of the plane of the cross-section. For example, in some embodiments, in the plane of the cross-section of the optically diffusive layer in the thickness direction of the optically diffusive layer, the voids occupy from about 15% to about 45% of the area of the plane of the cross-section.

In some embodiments, for at least one of the first (10) and second (10' or 10") optically diffusive layers, the particles in the plurality of non-uniformly dispersed particles 20 form a plurality of particle aggregates 40 defining a plurality of voids 50 therebetween, such that in a plane (e.g., the x-z-plane refereeing to the x-y-z coordinate system of FIGS. 2-3) of a cross-section of the optically diffusive layer in a thickness direction (z-direction) of the optically diffusive layer: an average size of the particle aggregates is between about 5 microns and about 10 microns; and the voids 50 occupy from about 5% to about 50% of an area of the plane of the cross-section. In some embodiments, for at least one of the first (10) and second (10' or 10") optically diffusive layers, the particles in the plurality of non-uniformly dispersed particles form a plurality of particle aggregates 40) defining a plurality of voids 50 therebetween, such that in a plane of a cross-section of the optically diffusive layer in a thickness direction (z-axis) of the optically diffusive layer: an average size of the particle aggregates is between about 5 microns and about 10 microns; and the voids 50 occupy from about 5% to about 50% of an area of the plane of the cross-section. In some embodiments, the voids 50 occupy from about 15% to about 45% (or any range described elsewhere) of the area of the cross-section.

The percent of the area of the cross-section occupied by the voids 50 can be determined using image analysis techniques. For example, the optically diffusive layer can be cut by micro-tome and then a scanning electron microscope (SEM) image of the cross-section can be taken and then analyzed using image analysis software (e.g., as described in the Examples) to determine the percent area occupied by the voids. The average size of the aggregates can also be determined from an analysis of the image. The size of an aggregate in a cross-section can be the equivalent circular diameter of the aggregate (i.e., the diameter of a circle having the same area in the cross-section as the aggregate).

Figure 4A:
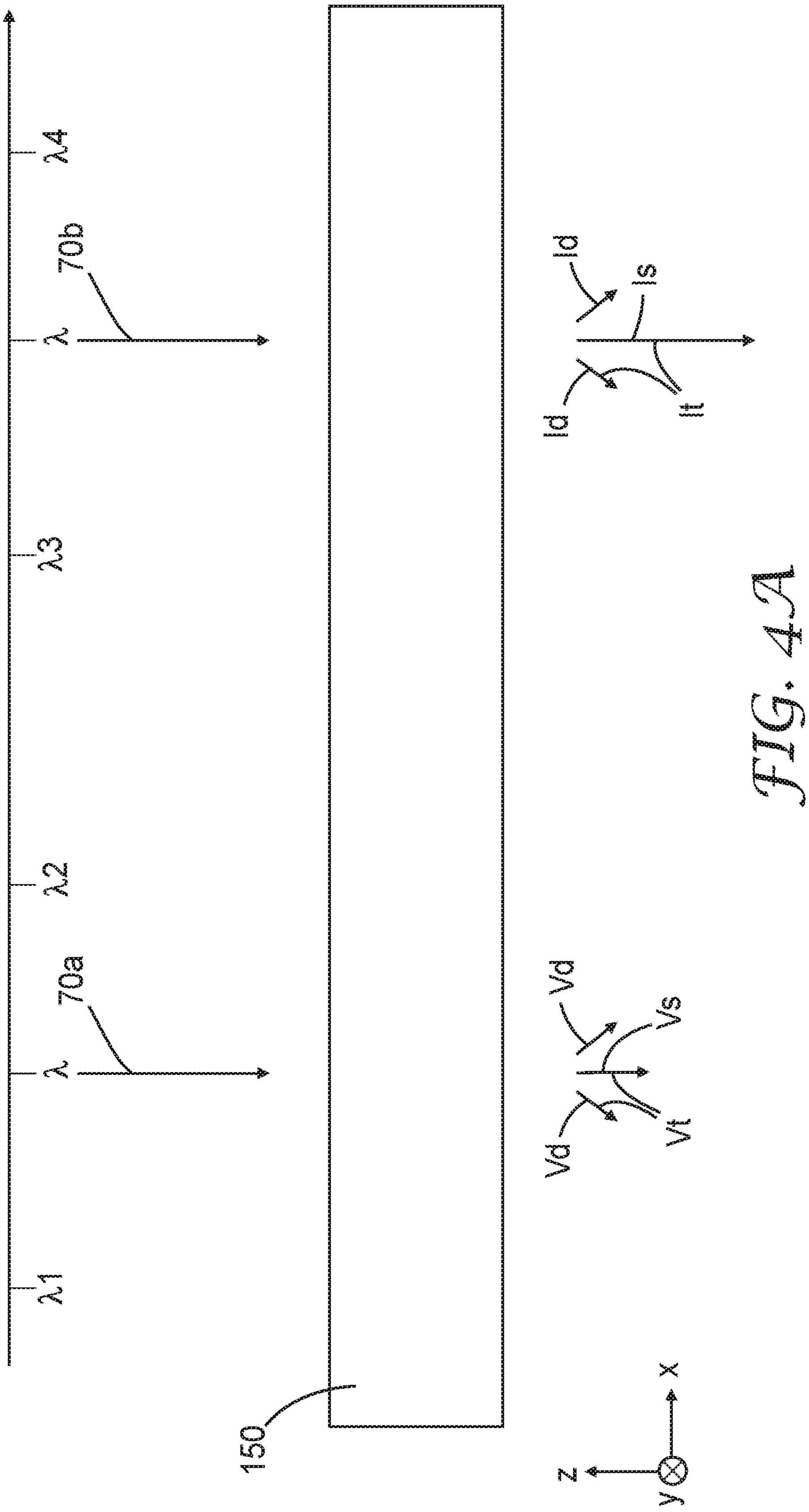
FIGS. 4A-4B are schematic cross-sectional views of films or layers schematically illustrating substantially normally incident light and diffusely and specularly transmitted light.
Figure 4B:
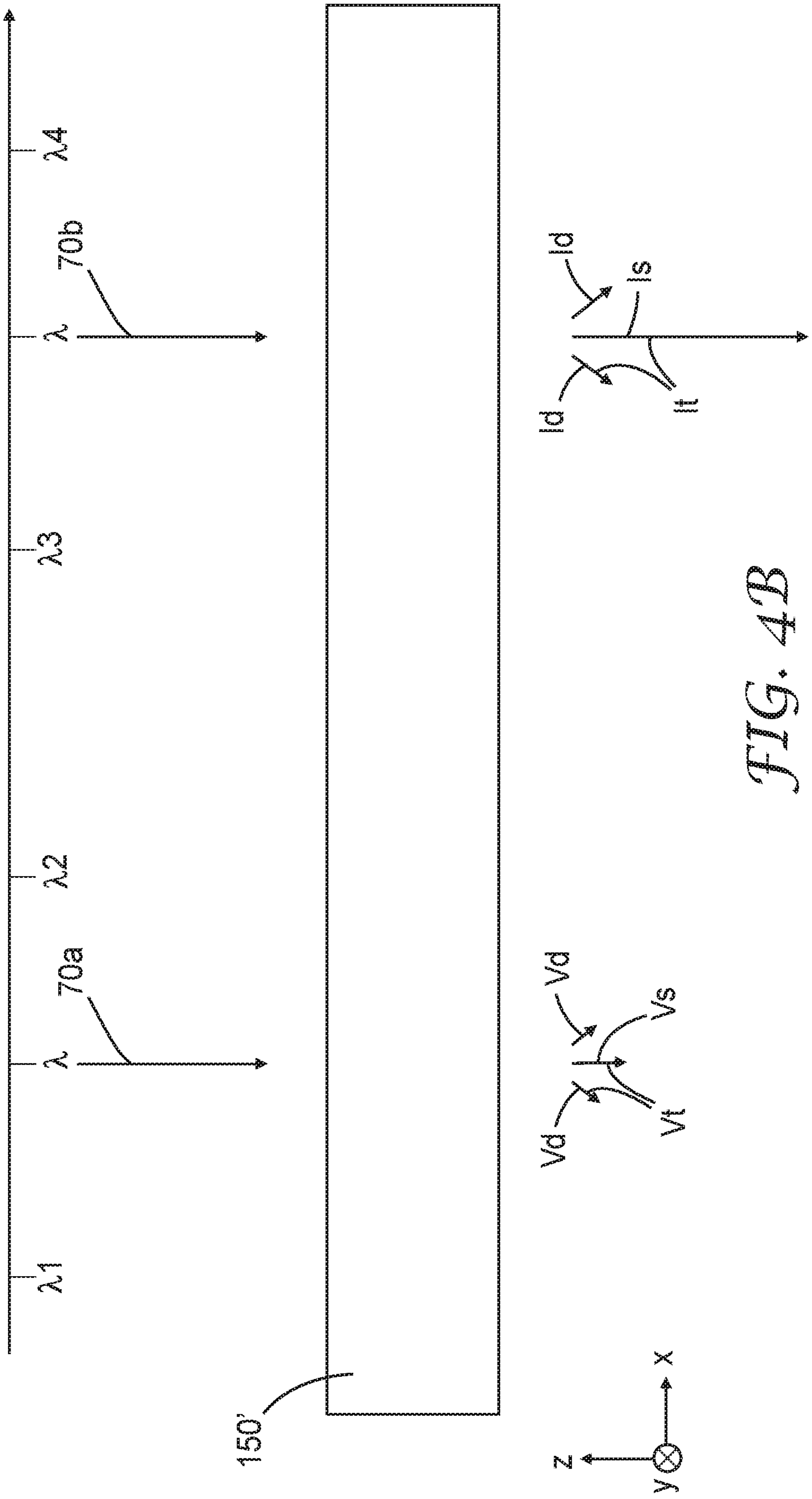

FIGS. 4A-4B are schematic cross-sectional views of films or layers 150, 150' illustrating light 70*a* and 70*b* substantially normally incident on the films or layers 150, 150'. The film or layers can correspond to any of the optical films or optically diffusive layers described herein. The light 70*a* has a wavelength in a range of $\lambda 1$ to $\lambda 2$ and the light 70*b* has a wavelength in a range of $\lambda 3$ to $\lambda 4$. In some embodiments, the range of $\lambda 1$ to $\lambda 2$ is a visible range and the range of $\lambda 3$ to $\lambda 4$ is an infrared range. For example, in some embodiments, $\lambda 1$ is about 450 nm, $\lambda 2$ is about 650 nm, $\lambda 3$ is about 930 nm, and $\lambda 4$ is about 970 nm. For the light 70*a* in the wavelength range $\lambda 1$ to $\lambda 2$, the films or layers 150, 150' have an average specular transmittance Vs, an average diffuse transmittance Vd and an average total transmittance Vt (Vt=Vs+Vd). For the light 70*b* in the wavelength range $\lambda 3$ to $\lambda 4$, the films or layers 150, 150' have an average specular transmittance Is, an average diffuse transmittance Id and an average total transmittance It (It=Is+Id). The quantities Vs, Vd, Vt, Is, It, Id can be the same or different for the films or layers 150, 150'. For example, in some embodiments, film or layer 150 corresponds to one of the optically diffusive layers in optical stack 200 or 200' and film or layer 150' corresponds to the other of the optically diffusive layers. The ratio Is/Vs may be higher for one of the optically diffusive layers than the other of the optically diffusive layers and/or the ratio It/Vt may be higher for one of the optically diffusive layers than the other of the optically diffusive layers, for example.

In some embodiments, for substantially normally incident light 70, 70*a*, 70*b* and a visible wavelength range from about 450 nm to about 650 nm and an infrared wavelength range from about 930 nm to about 970 nm: in the visible wavelength range, the optical film 100 (resp., optically diffusive layer 10, 10', 10") has an average specular transmittance Vs; and in the infrared wavelength range, the optical film 100 (resp., optically diffusive layer 10, 10', 10") has an average total transmittance It and an average specular transmittance Is. In some embodiments, $Is/It \geq 0.6$ and $Is/Vs \geq 2.5$. In some embodiments, $Is/Vs \geq 3$. In some embodiments, $It/Vt > 1$, or $It/Vt > 2$, or $It/Vt > 3$. In some embodiments, $Is/It \geq 0.7$.

In some embodiments, for substantially normally incident light 70, 70*a*, 7*b* and a visible wavelength range from about 450 nm to about 650 nm and an infrared wavelength range from about 930 nm to about 970 nm: in the visible wavelength range, each of the first (10) and second (10' or 10") optically diffusive layers and has an average total transmittance Vt and an average specular transmittance Vs; and in the infrared wavelength range, each of the first and second optically diffusive layers has an average total transmittance It and an average specular transmittance Is. In some embodiments, $Is/It \geq 0.6$, and $Is/Vs \geq 2.5$. In some embodiments, $Is/Vs \geq 3$ for at least one of the first and second optically diffusive layers. In some embodiments, $Is/Vs < 4$ for one of the first and second optically diffusive layers and $Is/Vs \geq 4.5$ for the other one of the first and second optically diffusive layers. In some embodiments, $1 < It/Vt < 2.5$ for one of the first and second optically diffusive layers and $2.5 < It/Vt < 4$ for the other one of the first and second optically diffusive layers. In some embodiments, $1<It/Vt<2.5$ for the one of the first and second optically diffusive layers, and $2.5<It/Vt<4$ for the other one of the first and second optically diffusive layers.

If the polarization state of the incident light is not specified, it may be assumed that the incident light is unpolarized unless the context clearly indicates differently.

A high diffuse transmittance (e.g., high Vd) corresponds to a high optical haze. In some embodiments, the optical film or stack or the optically diffusive layer has an optical haze of at least about 20%, or at least about 30%, or at least about 40%, or at least about 50%. The optical haze is a ratio of diffuse luminous transmittance to total luminous transmittance and can be determined according to the ASTM D1003-13 test standard, for example.

In some embodiments, the optically diffusive layer 10, 10', 10' is formed by coating a mixture of the particles, monomer and a solvent, and then curing and drying the mixture. The monomer cures into a polymeric binder (polymeric material 30) bonding aggregates of the particles together and the solvent evaporates forming voids between the aggregates. The solvent can evaporate at least partially during curing and/or a subsequent drying step can be used to complete evaporation of the solvent. In some embodiments, the curing and drying includes a pre-cure step, then a drying step, and then a post-cure step. In some embodiments, the monomer is ultraviolet (UV) curable and a photoinitiator is included in the mixture. The size of the aggregates can be adjusted by changing the UV power used to cure the monomer with a higher power generally resulting in smaller aggregate size. It has been found that a relatively low amount of photoinitiator with a relative high UV power results in small aggregate size and a non-fragile layer while a higher amount of photoinitiator can result in a more fragile layer. The void fraction can be adjusted by changing the amount of solvent used in the mixture with a higher solvent loading generally resulting in a higher void fraction. In some embodiments, the mixture includes about 20 to about 60 weight percent solids.

In some embodiments, the polymeric material 30 is or includes a radiation cured (e.g., UV cured) polymer. In some embodiments, the polymeric material 30 is or includes an acrylate. In some embodiments, the polymeric material 30 is or includes pentaerythritol triacrylate.

Figure 5:
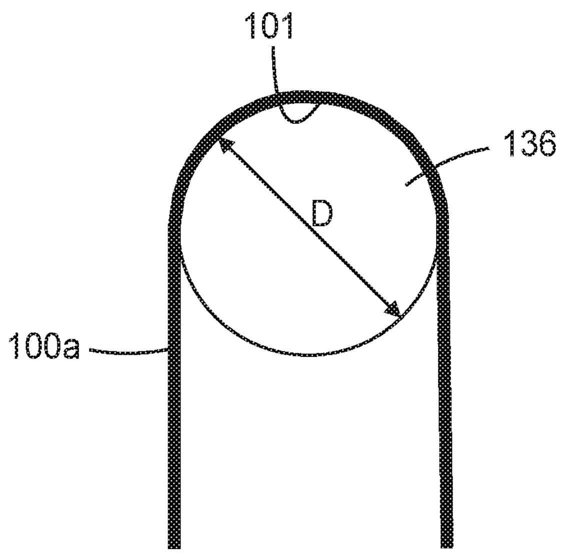
FIG. 5 is a schematic cross-sectional view of an optical film or stack bent around a cylinder.

FIG. 5 is a schematic cross-sectional view of an optical film or stack **100*a* bent around a cylinder 136 having a diameter D. In some embodiments, an optical film or an optical stack can be bent as schematically illustrated in FIG. 5 without damage, or with very little damage, to the optically diffusive layer of the optical film or to the optically diffusive layers of the optical stack. In some embodiments, bending the optical film 100*a* at a first bend location 101 over an inner diameter D of at most 10 mm results in no, or very little, damage to the optically diffusive layer 10 at the first bend location 101. Very little damage refers to damage not readily visible when the diffusive layer 10** is viewed with the unaided eye of a person with 20/20 vision.

In some embodiments, the particles or nanoparticles 20 are substantially spherical. In some embodiments, in the plane of the cross-section of the optically diffusive layer 10, 10', 10" in the thickness direction of the optically diffusive layer, the particles or nanoparticles 20 are substantially circular. A particle can be considered substantially circular in cross-section (resp., substantially spherical) if its outline fits within the intervening space between two, concentric, truly circular (resp., spherical) outlines differing in diameter from one another by up to about 30% of the diameter of the larger of these outlines. In some embodiments, each particle in at least a majority of the particles fits within the intervening space between two, concentric, truly spherical outlines differing in diameter from one another by up to about 20% or 10% of the diameter of the larger of these outlines. In some embodiments, each particle in at least a majority of the particles in the cross-section fits within the intervening space between two, concentric, truly circular outlines differing in diameter from one another by up to about 20% or 10% of the diameter of the larger of these outlines.

Figure 6:
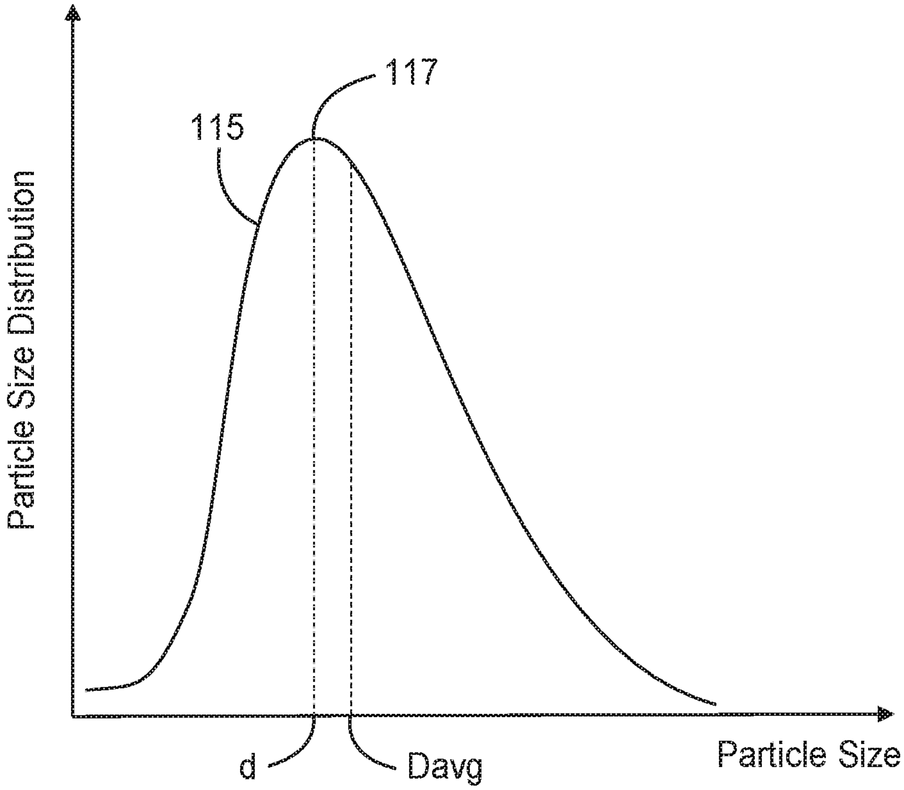
FIGS. 6-7 are schematic plots of illustrative particle size distributions.
Figure 7:
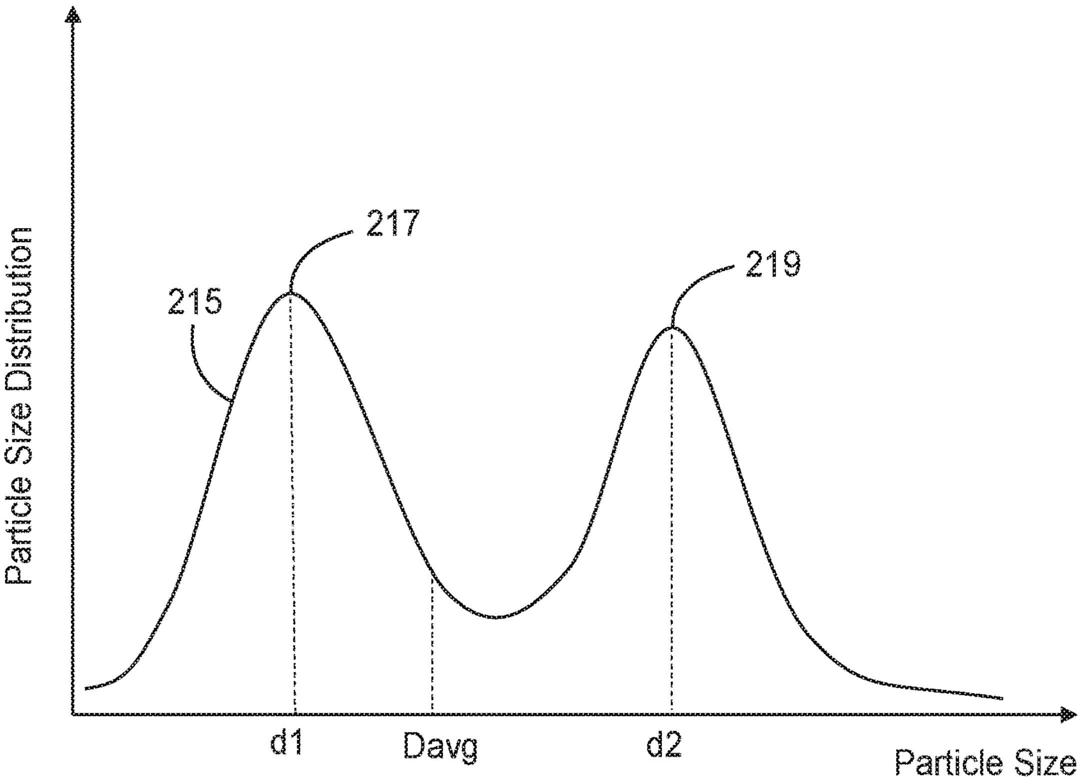

The particles can have a monomodal, bimodal, or multimodal particle size distribution. FIGS. 6-7 are schematic particle size distribution plots, according to some embodiments. In FIG. 6, the particle size distribution 115 has a peak 117 at a particle size d. The particles have an average size Davg. The average size can be less than, greater than, or about the same as the size d, depending on the shape of the particle size distribution. In some embodiments, the plurality of nanoparticles 20 has a nanoparticle size distribution 115 including a peak 117 at a nanoparticle size d from about 20 nm to about 150 nm, or from about 20 nm to about 100 nm.

In FIG. 7, the particle size distribution 215 has a first peak 217 at a particle size d1 and a second peak 219 at a particle size d2. In some embodiments, the plurality of nanoparticles 20 has a nanoparticle size distribution 215 including a first peak 217 at a first nanoparticle size d1 from about 5 nm to about 40 nm and a second peak 219 at a second nanoparticle size from d2 about 50 nm to about 100 nm. The particles have an average size Davg which may be between d1 and d2.

The average size Davg for the distribution 115 or 215 can be the mean or median size. For example, the average size Davg can be the Dv50 size (median size in a volume distribution or, equivalently, particle size where 50 percent of the total volume of the particles is provided by particles having a size no more than the Dv50 size). In some embodiments, the nanoparticles 20 have an average size in a range from about 20 nm to about 150 nm, or from about 30 nm, to about 120 nm, or from about 30 nm to about 100 nm, or from about 50 nm to about 90 nm, or from about 60 nm to about 90 nm.

In some embodiments, the optically diffusive layer 10, 10' and/or 10" is disposed on a structured layer. The structured layer can include structures having an average largest lateral dimension substantially larger than the particles 20 or substantially larger than the particle aggregates 40.

FIG. 8 is a schematic cross-sectional view of an optical film 100', according to some embodiments. The optical film 100' includes a structured layer 120 disposed between the substrate 110 and an optically diffusive layer **10*a* (e.g., corresponding to optically diffusive layer 10, 10', or 10"). The structured layer has a structured first major surface 121 facing the optically diffusive layer 10*a* and an opposite second major surface 122 facing the substrate 110. The first and second 11*a* and 12*a* major surfaces of the optically diffusive layer 10*a* substantially conform to the structured first major surface 121 of the structured layer 120. In some embodiments, the structured layer 120 includes a plurality of particles 123 dispersed in a binder 124, where the particles 123 form the structured first major surface 121 of the structured layer 120. In other embodiments, the structured layer 120 is formed from other means such as embossing or microreplication, for example. In some embodiments, the particles 123 can have an average particle size of at least about 2, 3, 5, or 10 times the average size of the particle aggregates 40, for example. The optical film 100' can have the specular, diffuse and total transmission properties described for optical film 100**, for example.

In some embodiments, the substrate 110 or the layer or film 60 is or includes a multilayer optical film. As is known in the art, multilayer optical films including alternating polymeric layers can be used to provide desired reflection and transmission in desired wavelength ranges by suitable selection of layer thicknesses. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example.

Figure 9A:
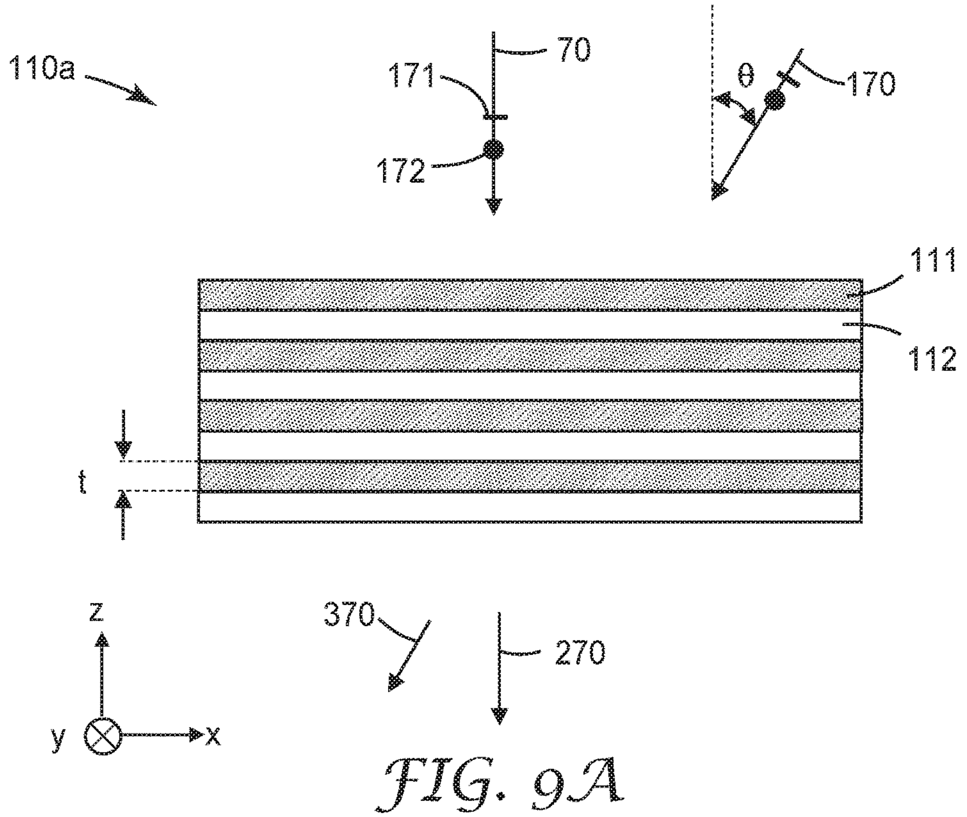
FIG. 9A is a schematic cross-sectional view of an illustrative plurality of alternating layers.

FIG. 9A is a schematic cross-sectional view of a substrate, layer or film 110*a* including a plurality of alternating first and second polymeric layers 111 and 112. The number of layers can be substantially larger than shown in the schematic illustration of FIG. 9. In some embodiments, the plurality of alternating first and second polymeric layers 111 and 112 number at least 20 in total (e.g., 20 to 1000 layers, or 30 to 500 layers, or 40 to 400 layers). In some embodiments, an average thickness t of each of the first and second polymeric layers 111 and 112 is less than about 350 nm.

The substrate, layer or film 110*a* can include layers in addition to the first and second polymeric layers 111 and 112. For example, the substrate layer or film 110*a* can include protective boundary layers on each side of a packet of the polymeric layers 111, 112 to protect the polymeric layers 111 and 112 during processing as is known in the art.

Figure 9B:
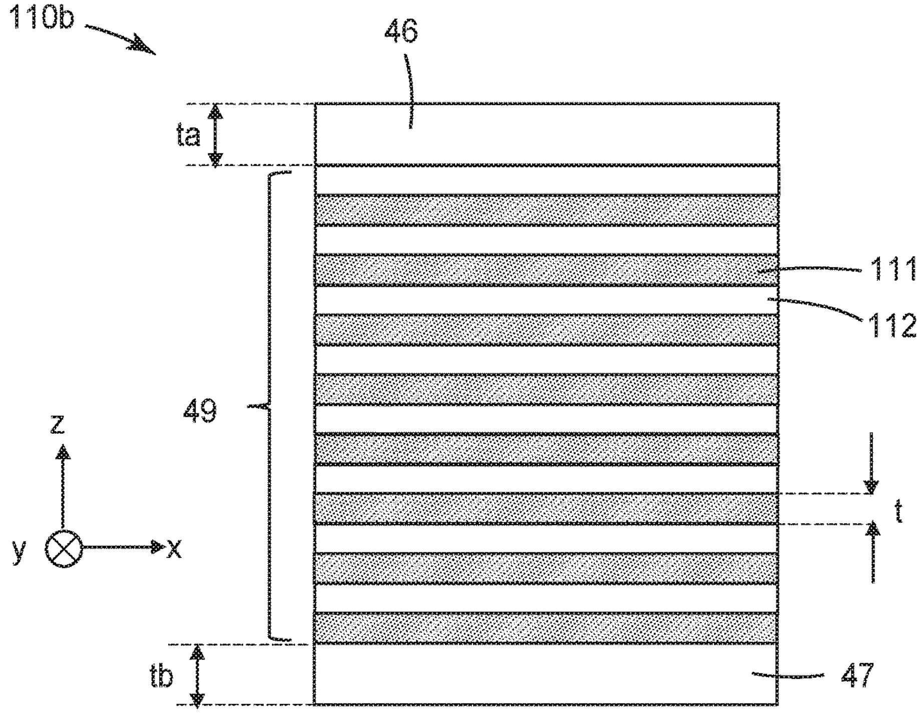
FIGS. 9B-9C are schematic cross-sectional views of illustrative multilayer films.

In some embodiments, as schematically illustrated in FIG. 9B, the substrate, layer or film 110*b* includes a single packet 49 of polymeric layers 111, 112 between opposing first and second outer layers 46 and 47. In some embodiments, first and second outer layers 46 and 47 each have an average thickness ta, tb of greater than about 500 nm.

Figure 9C:
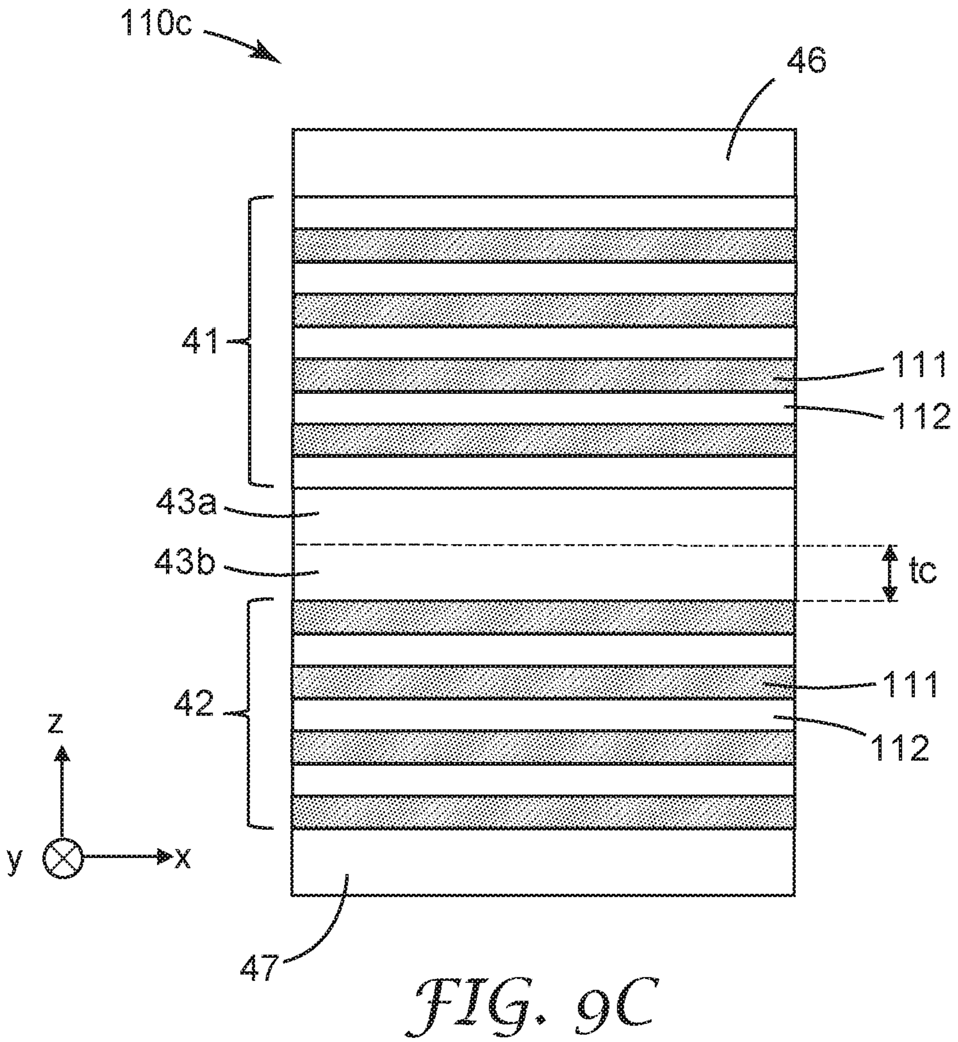

In some embodiments, as schematically illustrated in FIG. 9C, the substrate, layer or film 110*c* includes two packets of polymeric layers 111, 112 so that the plurality of polymeric layers includes a plurality of first polymeric layers 41 spaced apart along a thickness direction of the substrate, layer or film 110*c* from a plurality of second polymeric layers 42 by one or more middle layers 43*a*, 43*b*. In some embodiments, each of the pluralities of first and second polymeric layers 41 and 42 number at least 200 in total and is disposed between, and co-extruded and co-stretched with, the opposing first and second outer layers 46 and 47. The one or more middle layers 43*a*, 43*b* can be two protective boundary layers, or a single layer formed from two protective boundary layers, for example. In some embodiments, each of the first and second polymeric layers have an average thickness of less than about 350 nm or less than about 300 nm, and each of the one or more middle layers 43*a*, 43*b* has an average thickness tc of greater than about 500 nm.

In some embodiments, one or both of the outer layers 46, 47 includes a plurality of particles to provide a structured major surface facing away from the polymeric layers 111, 112 as generally described in co-pending U.S. provisional application 63/021,765 titled REFLECTIVE POLARIZER WITH IMPROVED OPTICAL CHARACTERISTICS and filed on May 8, 2020, and hereby incorporated herein by reference to the extent that it does not contradict the present description.

The average thickness ta, tb, tc can each be greater than about 500 nm, or greater than about 1 micrometer, or greater than about 3 micrometers, or greater than about 5 micrometers.

The substrate, layer or film 110*a*, 110*b* or 110*c* can be a reflective polarizer or an optical mirror, for example. Substantially normally incident light 70 and light 170 incident at an incident angle θ is schematically illustrated in FIG. 9.

The substrate, layer or film 110*a*, 110*b* or 110*c* can have different transmission and reflection properties for light 70 and 170. First and second polarization states 171 (polarized in x-z plane) and 172 (polarized along y-axis) are schematically illustrated. In some embodiments, the substrate, layer or film 110*a*, 110*b* or 110*c* is a reflective polarizer and the first polarization state 171 is a pass polarization state and the second polarization state 172 is a block polarization state. Portions of the incident lights 70 and 170 are transmitted as lights 270 and 370, respectively. Lights 270 and 370 typically are primarily polarized in the first polarization state when this is the pass state for the reflective polarizer. In some embodiments, the reflective polarizer is a collimating reflective polarizer. Collimating reflective polarizers are known in the art and are described in U.S. Pat. No. 9,441,809 (Nevitt et al.) and U.S. Pat. No. 9,551,818 (Weber et al.), for example. In some embodiments, for the first polarization state 171 and a visible wavelength range (e.g., 450 nm to 650 nm), the reflective polarizer has a greater average optical transmittance (e.g., light 270) for light (e.g., light 70) incident at a smaller incident angle and a smaller average optical transmittance (e.g., light 370) for light (e.g., light 170) incident at a greater incident angle (e.g., θ). In some embodiments, the first polarizations state is a p-polarization state (polarized in the plane of incidence) and the greater incident angle is less than about 50 degrees, or less than about 40 degrees.

Other suitable reflective polarizers are described in co-pending U.S. provisional applications 63/021,743 titled OPTICAL FILM and 62/704,400 titled OPTICAL FILM, both filed on May 8, 2020 and hereby incorporated herein by reference to the extent that they do not contradict the present description.

In some embodiments, the substrate 110 (or 60 or 110*a*, 110*b* or 110*c*) is or includes a reflective polarizer, such that for substantially normally incident light 70 and a predetermined wavelength range (e.g., from λ1 to λ2 or from λ3 to λ4), the reflective polarizer has an average optical transmittance of at least 40% for a first polarization state (e.g., polarization state 171 or polarized along the x-axis) and an average optical reflectance of at least 70% for an orthogonal second polarization state (e.g., polarization state 172 or polarized along the y-axis). In some embodiments, for substantially normally incident light 70 and a predetermined wavelength range (e.g., from λ1 to λ2 or from λ3 to λ4), the reflective polarizer has an average optical transmittance of at least 50% or at least 60% for the first polarization state and an average optical reflectance of at least 70% or at least 80% for the second polarization state. In some embodiments, the substrate 110 (or 60 or 110*a*, 110*b* or 110*c*) is or includes a reflective polarizer, such that for substantially normally incident light 70 and a visible wavelength range from about 450 nm to about 650 nm and an infrared wavelength range from about 930 nm to about 970 nm: the reflective polarizer transmits at least 40% of the incident light for a first polarization state for each wavelength in the visible wavelength range, reflects at least 70% of the incident light for an orthogonal second polarization state for each wavelength in the visible wavelength range, and transmits at least 40% of the incident light for each of the first and second polarization states for each wavelength in the infrared wavelength range. In some embodiments, for substantially normally incident light 70: the reflective polarizer transmits at least 50% or at least 60% of the incident light for the first polarization state for each wavelength in the visible wavelength range, reflects at least 70% or at least 80% of the incident light for the second polarization state for each wavelength in the visible wavelength range, and transmits at least 50% or at least 60% of the incident light for each of the first and second polarization states for each wavelength in the infrared wavelength range.

Figure 10A:
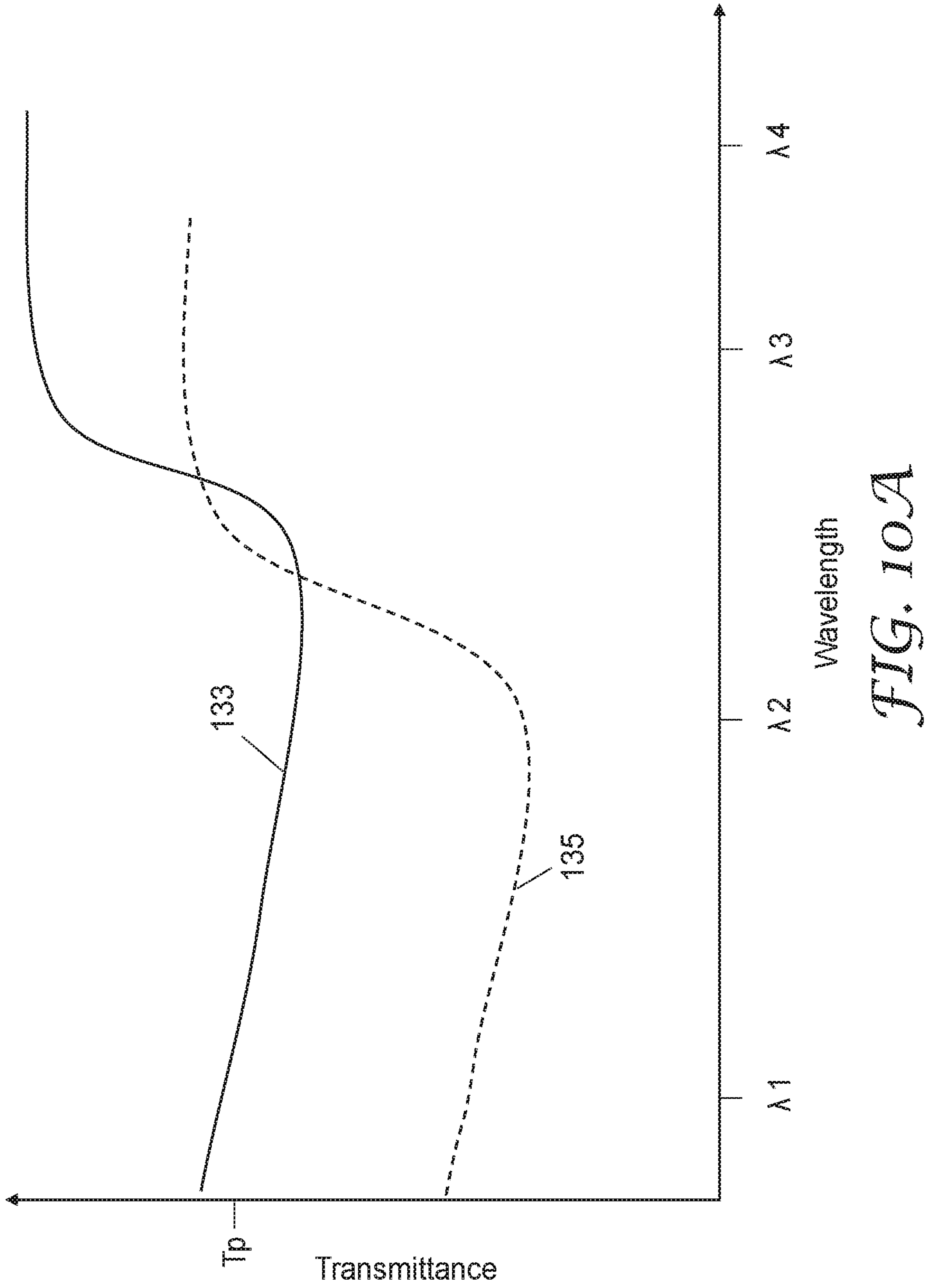
FIGS. 10A, 10B, and 11 are schematic plots of transmittance versus wavelength.
Figure 10B:
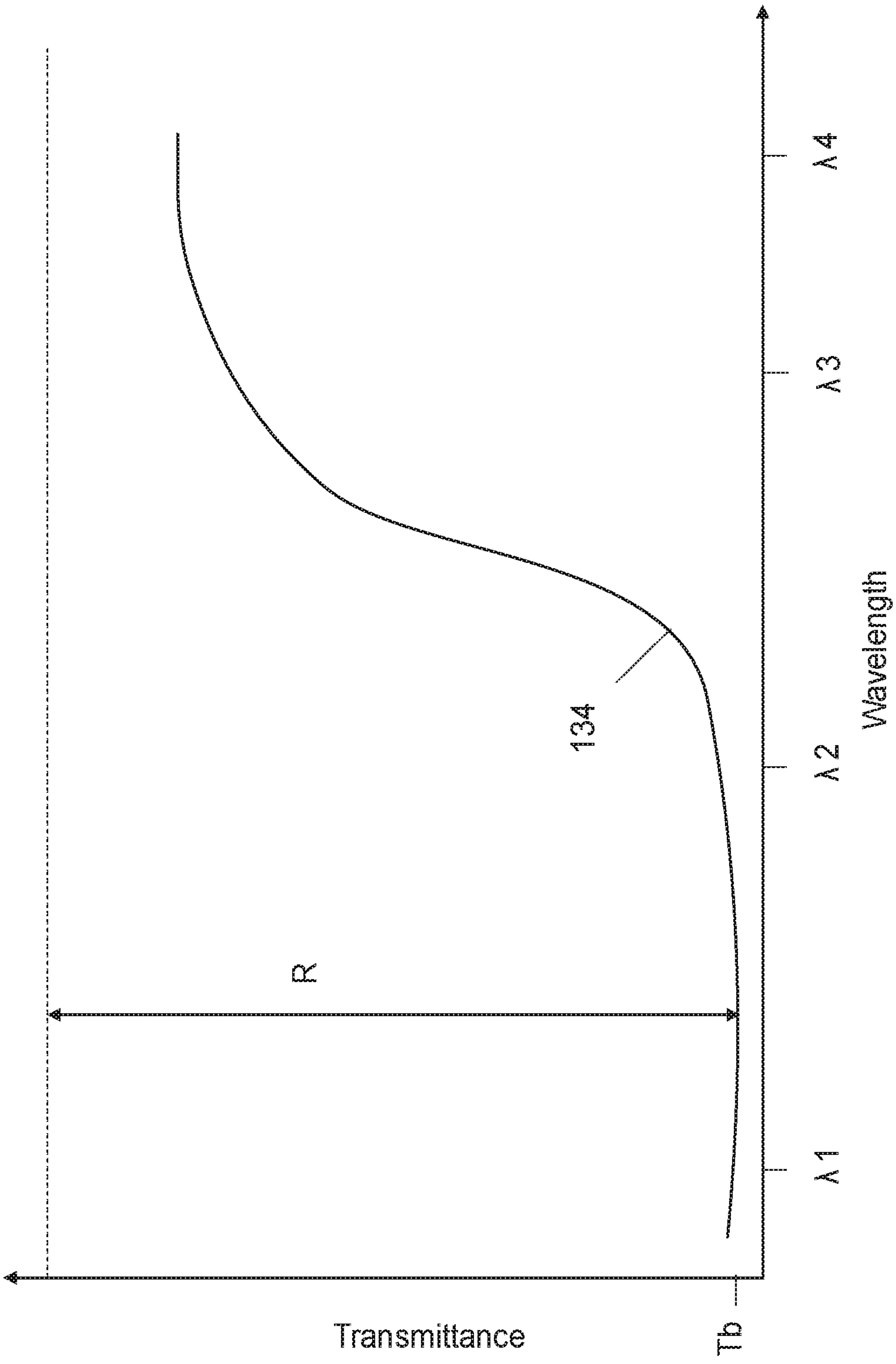

FIGS. 10A-10B are schematic plots of transmittance versus wavelength for a reflective polarizer for substantially normally incident light 70 for a first polarization state (transmittance 133 in FIG. 10A) and for an orthogonal second polarization state (transmittance 134 in FIG. 10B), respectively, according to some embodiments. The transmittance 135 versus wavelength for a reflective polarizer for light 170 incident at an incident angle θ is also schematically illustrated. In some embodiments, for the first polarization state and the predetermined wavelength range, the reflective polarizer has a greater average optical transmittance for light incident at a smaller incident angle (e.g., transmittance 133) and a smaller average optical transmittance for light incident at a greater incident angle (e.g., transmittance 135). The smaller incident angle can be in a range of zero degrees to about 20 degrees, or can be approximately zero degrees, for example. The greater incident angle can be in a range of about 30 degrees to about 50 degrees, or can be about 45 degrees, for example. In some embodiments, for the predetermined wavelength range, the reflective polarizer has a greater average optical transmittance for substantially normally incident light and a smaller average optical transmittance for light incident at an angle of incidence of about 45 degrees for a first (pass) polarization state for any plane of incidence. In some embodiments, a difference between the greater average optical transmittance and the smaller average optical transmittance is at least 10%, or at least 20%, or at least 30%.

In some embodiments, the transmission for substantially normally incident light in the second polarization state is higher for a smaller wavelength in the predetermined wavelength range and lower for a greater second wavelength in the predetermined wavelength range. Such a sloped block state transmittance can provide reduced color shift with viewing angle.

The average transmittance (resp., reflectance, absorption) is the mean of the transmittance (resp., reflectance, absorption) over the predetermined wavelength range. For a reflective polarizer where absorption is negligible, the reflectance R is approximately 100% minus the transmittance. The average transmittance Tp in the first (pass) polarization state and the average transmittance Tbl in the second (block) polarization state for substantially normally incident light 70 in the wavelength range from λ1 to λ2 is indicated in FIGS. 10A-10B. The indicated value of R is approximately the average optical reflectance for substantially normally incident light 70 in the wavelength range from λ1 to λ2.

The transmittance 133 is a pass state transmittance for the reflective polarizer and the transmittance 134 is a block state transmittance for the reflective polarizer. Alternatively, the transmittance 134 can schematically represent the transmittance for an optical mirror in each of two orthogonal polarization states. In some embodiments, the substrate 110 (or 60 or 110*a*, 110*b* or 110*c*) is or includes an optical mirror, such that for substantially normally incident light 70 and a predetermined wavelength range, the optical mirror has an average optical reflectance (mean of R over the predetermined wavelength range) of at least 60% or at least 70% or at least 80% for each of mutually orthogonal first (e.g., polarized along the x-axis) and second (e.g., polarized along the y-axis) polarization states.

Figure 11:
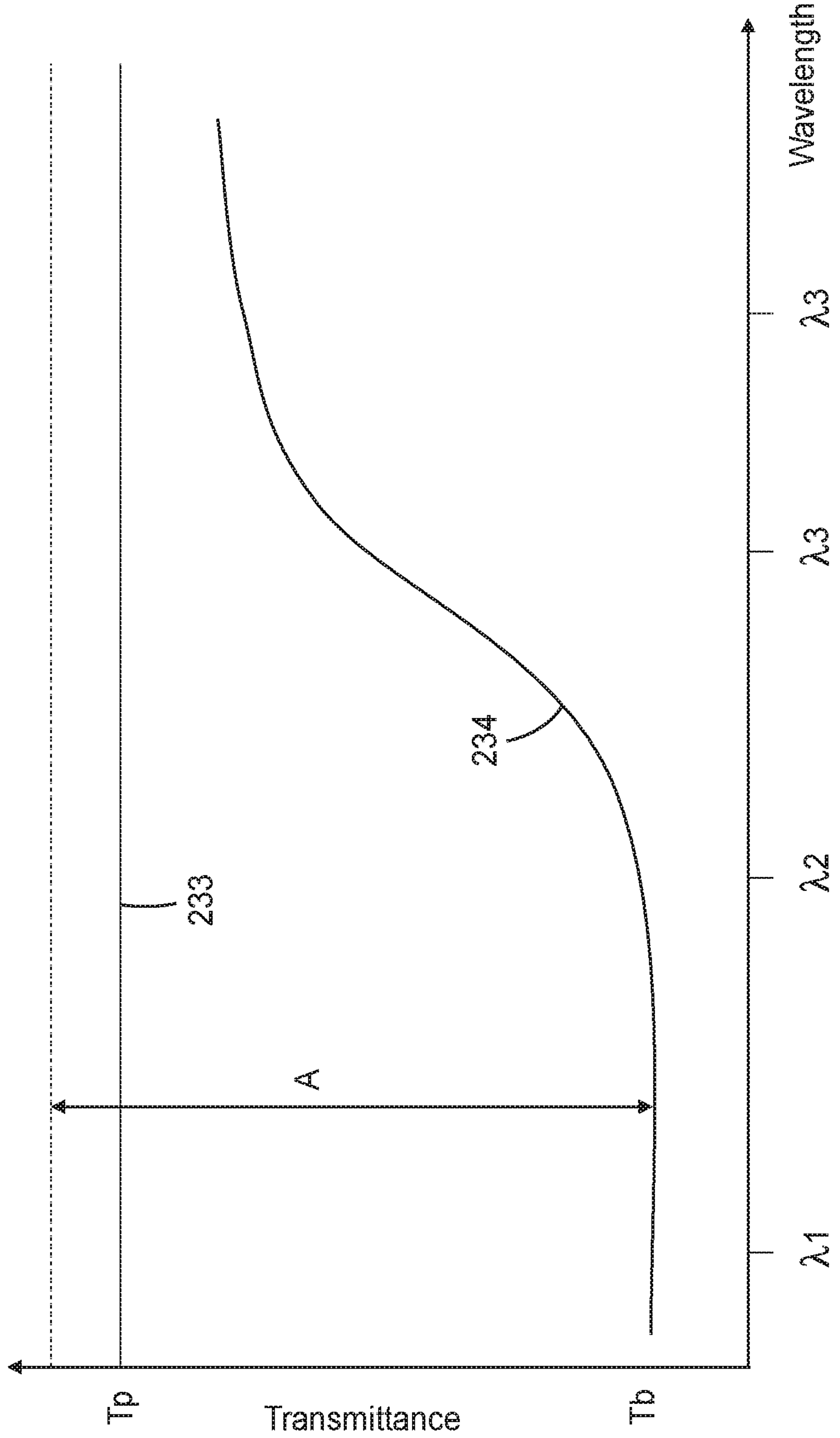

FIG. 11 is a schematic plot of transmittance versus wavelength for an absorbing polarizer for substantially normally incident light 70 for a first polarization state (transmittance 233) and for an orthogonal second polarization state (transmittance 234), according to some embodiments. For an absorbing polarizer where reflection is negligible, the absorption A is approximately 100% minus the transmittance. The average transmittance Tp in the first (pass) polarization state and the average transmittance Tbl in the second (block) polarization state for substantially normally incident light 70 in the wavelength range from λ1 to λ2 is indicated in FIG. 11. The indicated value of A is approximately the average optical absorption for substantially normally incident light 70 in the wavelength range from λ1 to λ2.

In some embodiments, the substrate 110 (or 60 or 110*a*, 110*b* or 110*c*) is or includes an absorbing polarizer, such that for substantially normally incident light 70 and a predetermined wavelength range, the absorbing polarizer has an average optical transmittance of at least 40% for a first polarization state (e.g., 171) and an average optical absorption of at least 60% for an orthogonal second polarization state (e.g., 172). In some embodiments, for the substantially normally incident light 70 and the predetermined wavelength range, the absorbing polarizer has an average optical transmittance of at least 50% or at least 60% for the first polarization state and an average optical absorption of at least 70% or at least 80% for the second polarization state. The absorption and transmittance can be adjusted by suitable selection of dye concentration The predetermined wavelength range used to determine average reflectance, transmittance, and/or absorption can be from about 450 nm to about 650 nm or from about 930 nm to about 970 nm, for example.

Figure 12:
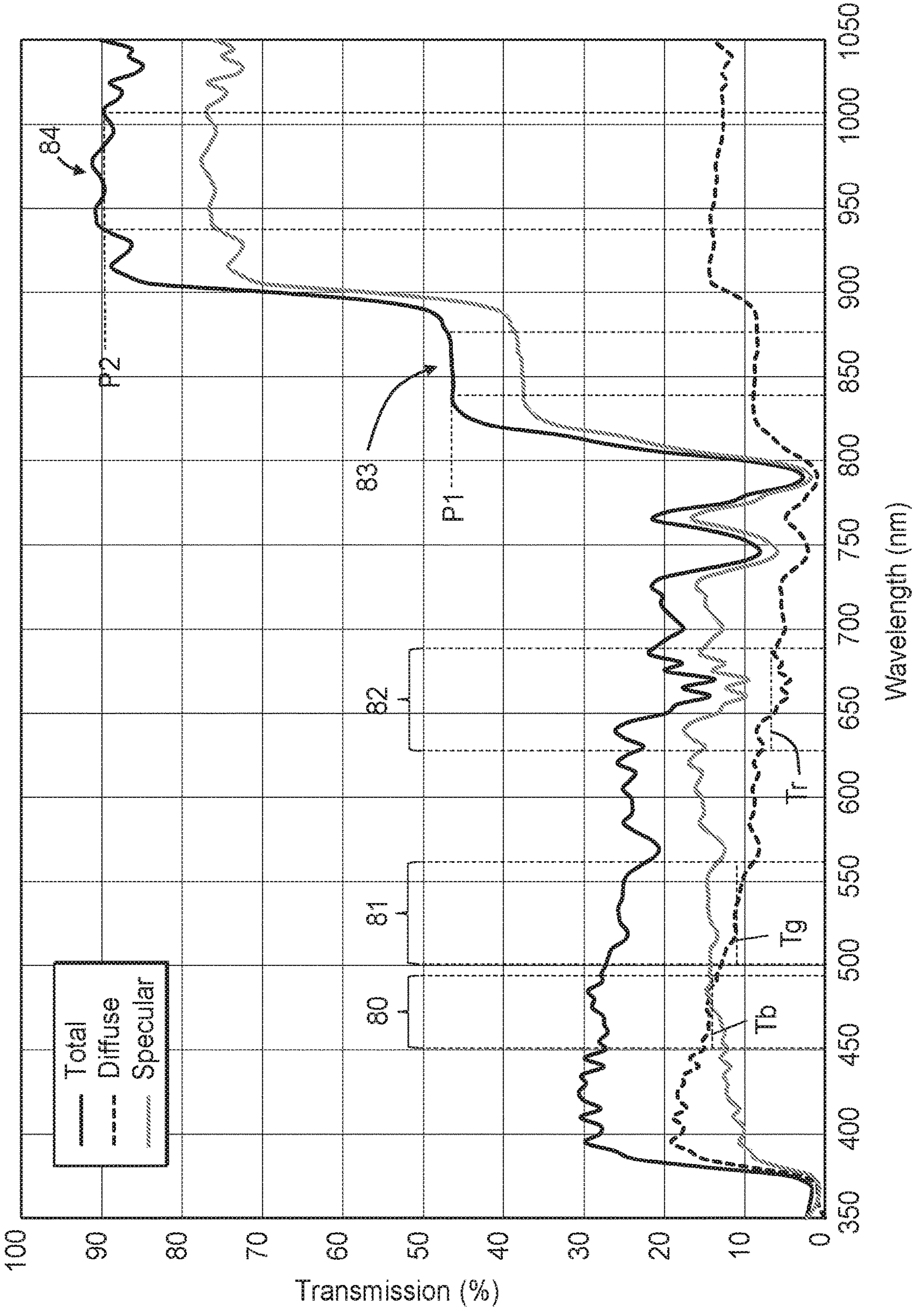
FIGS. 12-13 are plots of transmission versus wavelength for exemplary optical films.

FIG. 12 is a plot of transmission versus wavelength for substantially normally incident light 70 for an optical film, according to some embodiments. In the illustrated embodiment, the optical film (e.g., corresponding to 100 or 100') includes an optically diffusive layer disposed on a reflective polarizer and the light 70 is unpolarized. In some embodiments, for substantially normally incident light 70, the optical film has average diffuse optical transmittances Tb, Tg and Tr in respective wavelength ranges of about 450 to about 485 nm (wavelength range 80), about 500 to about 565 nm (wavelength range 81), and about 625 to about 680 nm (wavelength range 82), where Tb>Tg>Tr. In some embodiments, Tb, Tg and Tr are less than about 30%, or less than about 25%, or less than about 20%. In some embodiments, Tb-Tg and Tg-Tr are each greater than about 1% or greater than about 2%. In some embodiments, Tb-Tr is greater than about 3% or greater than about 5%. In some embodiments, for the substantially normally incident light 70, a total transmittance of the optical film has spaced apart first and second plateau regions 83 and 84 between about 800 and 1100 nm where each plateau region is at least 20 nm wide. The first and second plateau regions 83 and 84 have respective average total transmittances P1 and P2. In some embodiments, P2 is greater than P1 by greater than about 20%, or greater than 25%, or greater than 30%, or greater than 35%. In some embodiments, the first plateau region 83 is disposed between 800 nm and the second plateau region 84. In some embodiments, the first plateau region 83 includes 860 nm and the second plateau region 84 includes 950 nm.

For the optical film of FIG. 12, a substantially normally incident unpolarized light 70*a*, and a visible wavelength range of about 450 nm to about 650 nm, the optical film has an average total transmittance Vt of about 25.27%, an average diffuse transmittance Vd of about 10.75%, and an average specular transmittance Vs of about 14.52%. For the optical film of FIG. 12, a substantially normally incident unpolarized light 70*b*, and an infrared wavelength range of about 930 nm to about 970 nm, the optical film has an average total transmittance It of about 86.66%, an average diffuse transmittance Id of about 13.89%, and an average specular transmittance Is of about 75.77%.

Figure 13:
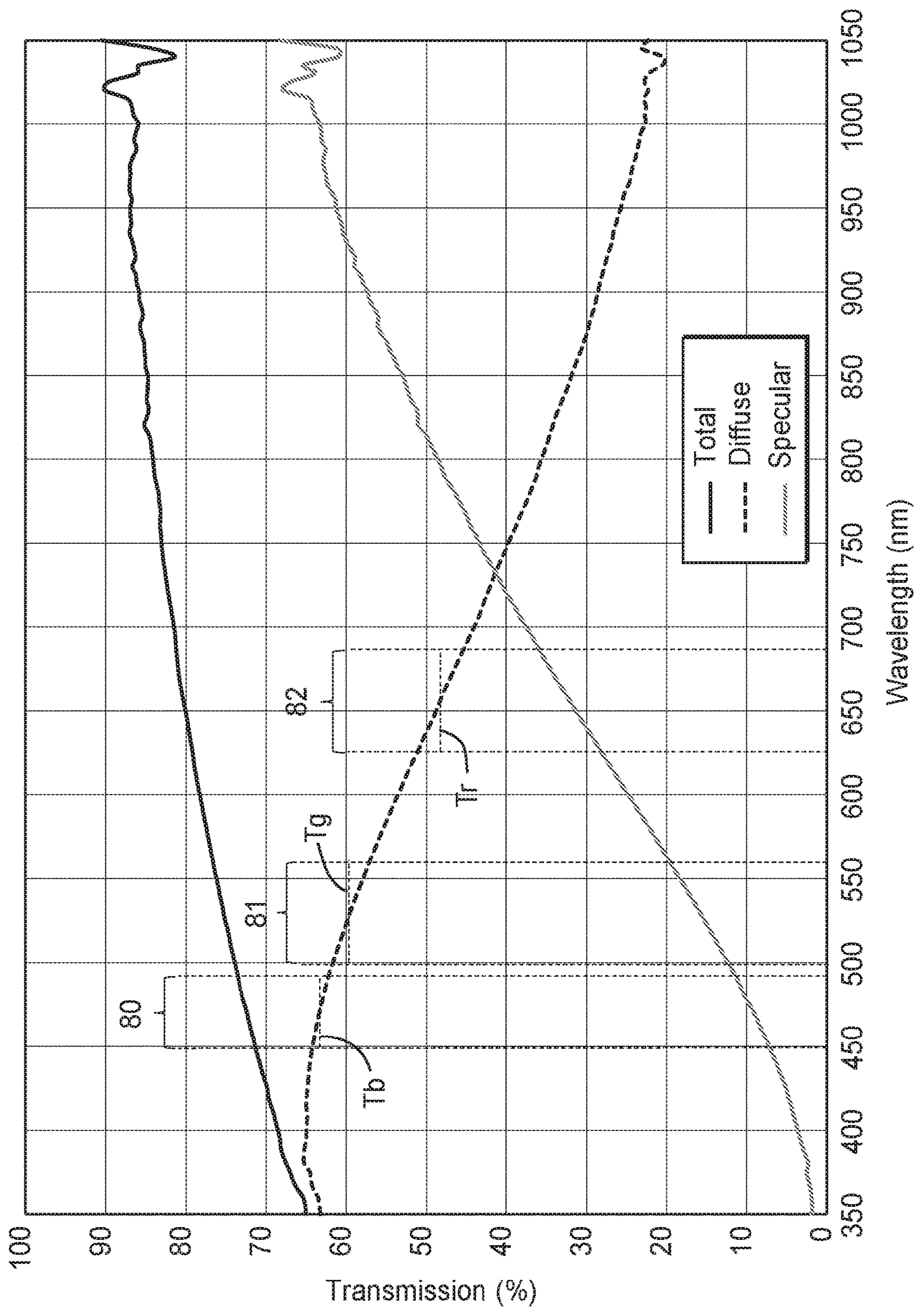

FIG. 13 is a plot of transmission versus wavelength for substantially normally incident light 70 for an optical film, according to some embodiments. In the illustrated embodiment, the optical film includes an optically diffusive layer without a reflective polarizer or mirror film. In some embodiments, for substantially normally incident light 70, which may be unpolarized, the optical film has average diffuse optical transmittances Tb, Tg and Tr in respective wavelength ranges of about 450 to about 485 nm (wavelength range 80), about 500 to about 565 nm (wavelength range 81), and about 625 to about 680 nm (wavelength range 82), where Tb>Tg>Tr. In some embodiments, Tb is less than about 80% or less than about 70%. In some embodiments, Tb is greater than about 40% or greater than about 50%. In some embodiments, Tr is greater than about 35% or greater than about 40%. In some embodiments, Tr is less than about 65% or less than about 60%. In some embodiments, Tb-Tg and Tg-Tr are each greater than about 1% or greater than about 2%. In some embodiments, Tb-Tr is greater than about 5% or greater than about 10%. In some embodiments, the optical film has a diffuse optical transmittance generally decreasing (e.g., monotonically decreasing or nonincreasing) over a wavelength range of about 450 nm to about 970 nm and a specular optical transmittance generally increasing (e.g., monotonically increasing or nondecreasing) over the wavelength range of about 450 nm to about 970 nm. In some such embodiments, the total optical transmittance generally increases over the wavelength range of about 450 nm to about 970 nm.

For the optical film of FIG. 13, a substantially normally incident unpolarized light 40*a*, and a visible wavelength range of about 450 nm to about 650 nm, the optical film has an average total transmittance Vt of about 76.06%, an average diffuse transmittance Vd of about 57.43%, and an average specular transmittance Vs of about 18.63%. For the optical film of FIG. 13, a substantially normally incident unpolarized light 40*b*, and an infrared wavelength range of about 930 nm to about 970 nm, the optical film has an average total transmittance It of about 86.94%, an average diffuse transmittance Id of about 25.69%, and an average specular transmittance Is of about 61.25%.

Figure 14A:
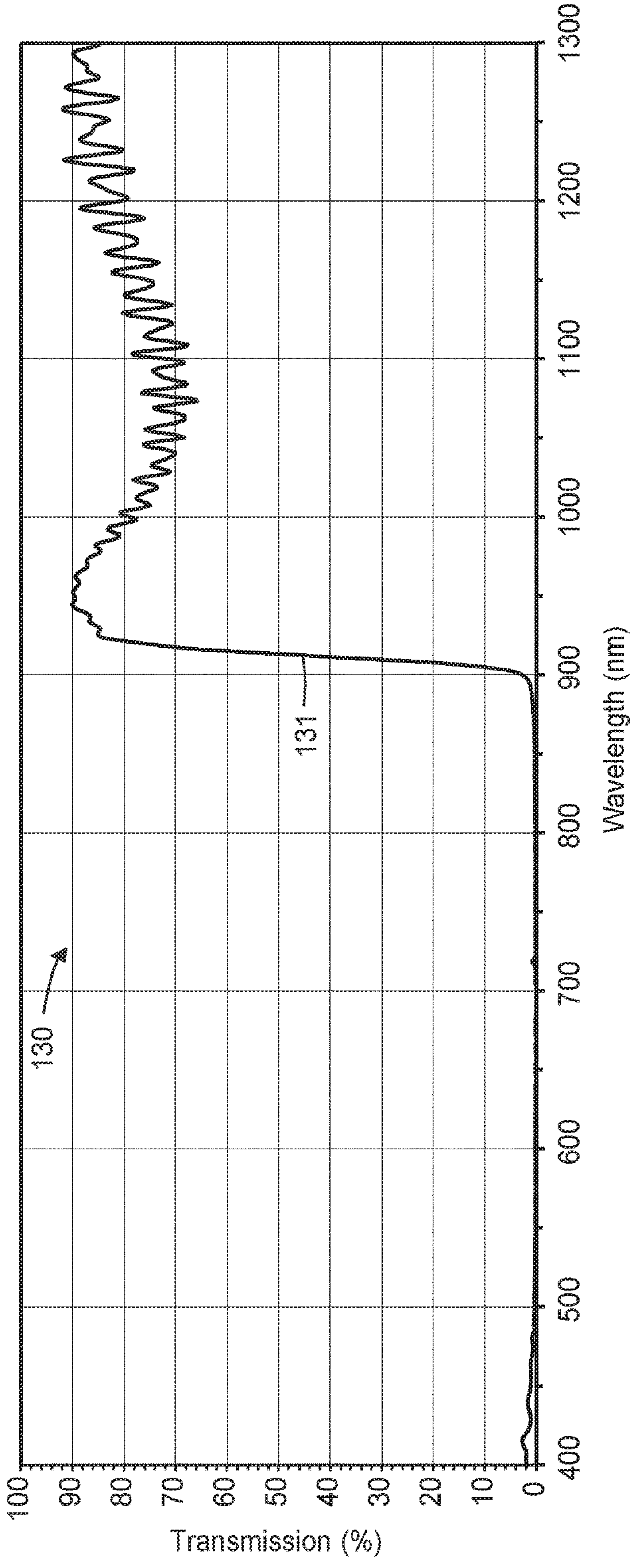
FIG. 14A is a plot of transmission versus wavelength for an exemplary optical film.
Figure 14B:
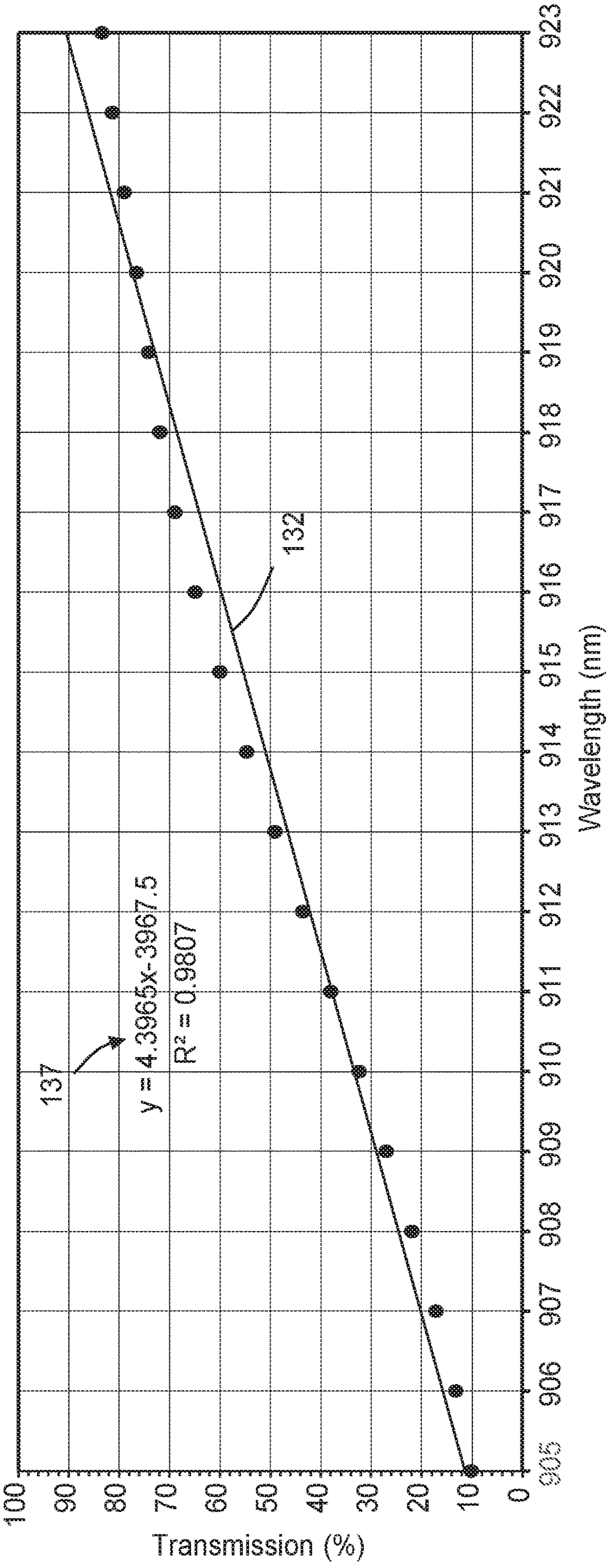
FIGS. 14B-14C is a portion of the plot of FIG. 14A.
Figure 14C:
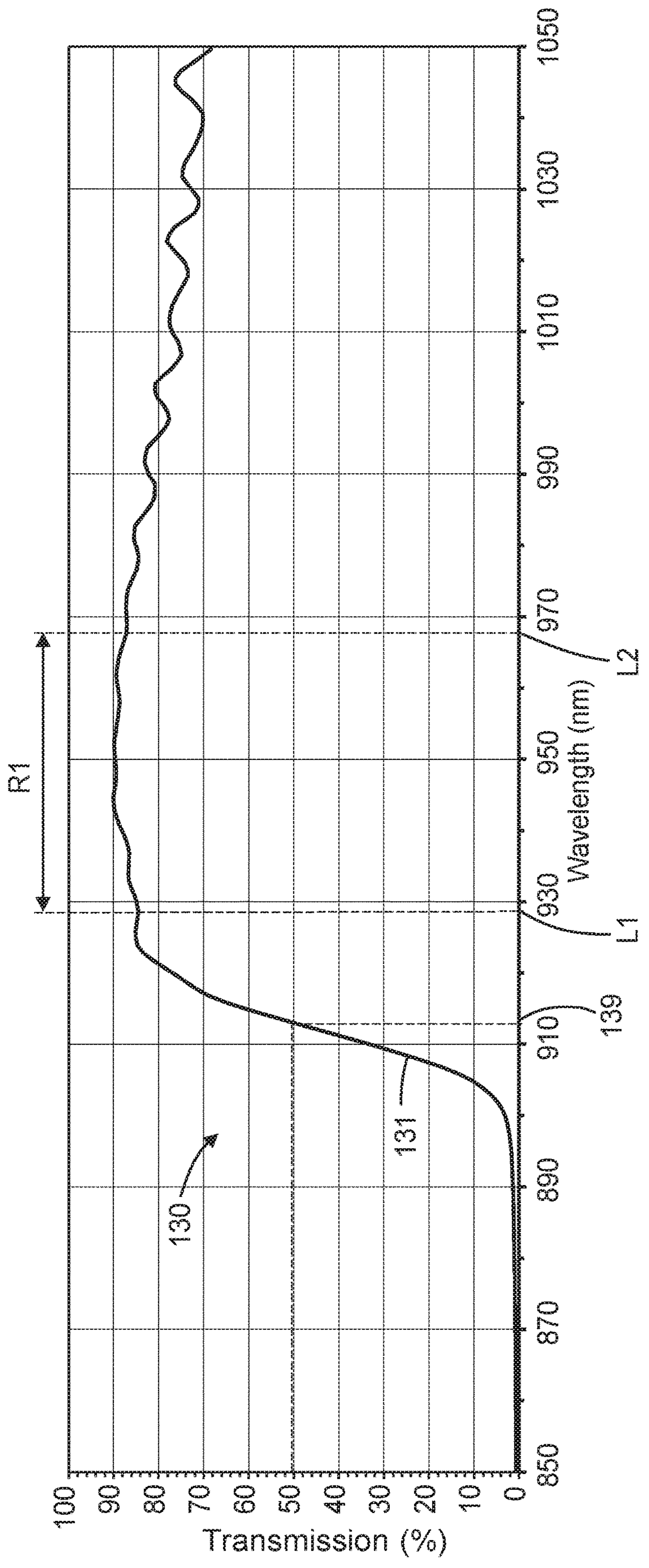

FIG. 14A is a plot of an optical transmittance 130 versus wavelength for substantially normally incident light 70 for an optical film, according to some embodiments. In the illustrated embodiment, the optical film is a reflective polarizer and the substantially normally incident light 70 is in a block state for the reflective polarizer. FIGS. 14B-14C are portions of the plot of FIG. 14A near the band edge 131. In some embodiments, an optical transmittance 130 of the reflective polarizer versus wavelength for a second (block) polarization state includes a band edge 131 where a best linear fit 132 to the band edge 131 correlating the optical transmittance 130 to the wavelength at least across a wavelength range where the optical transmittance along the band edge increases from about 10% to at least about 70% has a slope 137 of greater than about 2.5%/nm. In some embodiments, for a first wavelength range R1 extending from a smaller wavelength L1 to a greater wavelength L2, where 30 nm≤L2−L1≤50 nm and L1 greater than and within about 20 nm of a wavelength 139 corresponding to an optical transmittance of about 50% along the band edge, the optical transmittance has an average of greater than about 75%, or greater than about 80%, or greater than about 85%. The wavelength range R1 can include at least one of about 850 nm or about 940 nm, for example. In some embodiments, the slope 137 is greater than about 3%/nm, or greater than about 3.5%/nm, or greater than about 4%/nm. Optical films having sharpened band edges are known in the art and are described in U.S. Pat. No. 6,967,778 (Wheatley et al.), for example. In some embodiments, the reflective polarizer is a collimating reflective polarizer having apodized layer profiles as generally described in U.S. Pat. No. 9,551,818 (Weber et al.), for example. In some embodiments, the layer profile includes a first portion with a generally increasing layer thickness profile having a first slope and a second portion (e.g., the apodized portion) adjacent the first portion and having a generally decreasing layer thickness profile having a second slope having a magnitude substantially higher than the first slope. Related reflective OPTICAL FILM and filed on an even date herewith. An optically diffusive layer or layers can be disposed on the reflective polarizer as described further elsewhere herein.

Figure 15A:
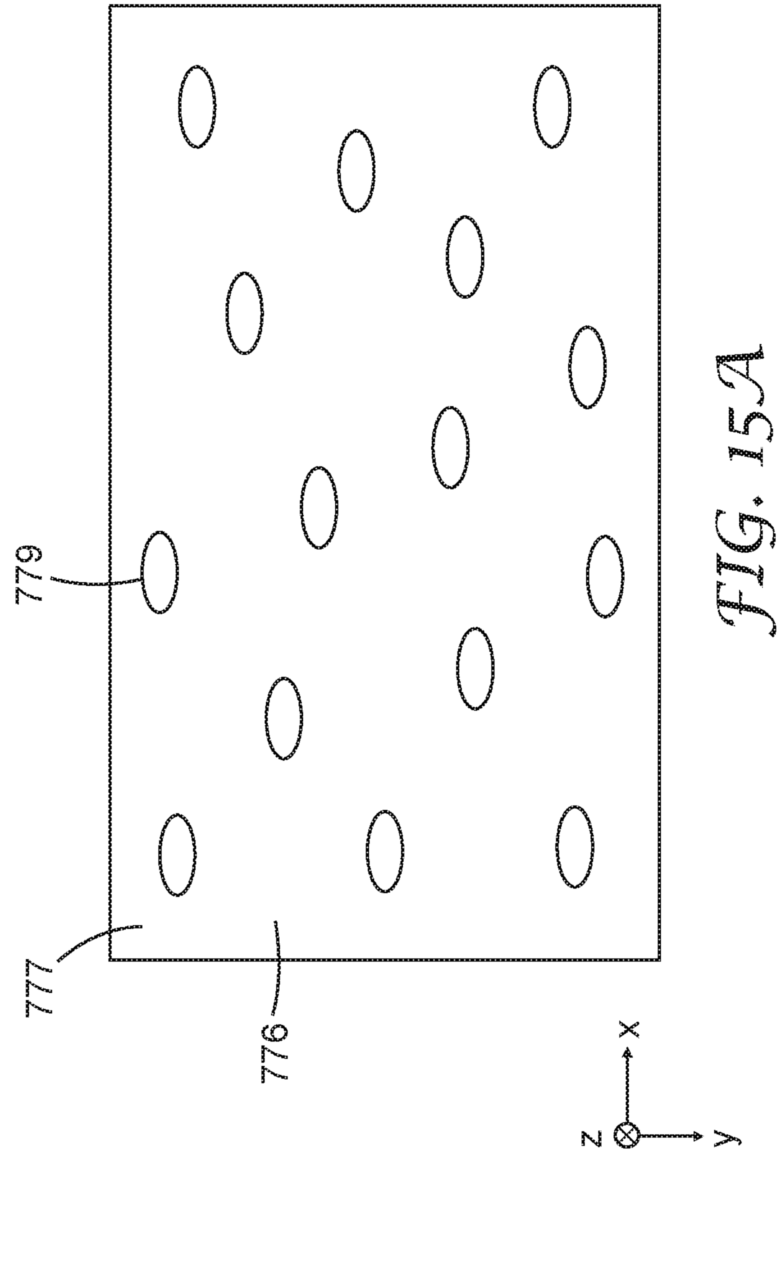
FIG. 15A is a schematic plan view of an illustrative bottom major surface.

FIG. 15A is a schematic bottom plan view of a major surface 777 of a layer 776. The layer 776 can correspond to an outer layer of an optical film or stack described elsewhere herein or can be an additional layer applied to a major surface of the optical film or stack. The major surface 777 can, in some embodiments, correspond to a major surface of the substrate 110 opposite the optically diffusive layer 10 in the optical film 100 or the optical stack 200', or a major surface of the optically diffusive layer 10' opposite the layer or film 60 in the optical stack 200, or a major surface of the layer or film 60 opposite the optically diffusive layer 10 in the optical stack 200', or a major surface of an optical layer disposed on any of these major surfaces, for example. The major surface 777 includes a plurality of bumps or structures 779. In some embodiments, the structured layer 776 includes a plurality of particles (e.g., corresponding to particles 123 but on an opposite side of the substrate 110) dispersed in a binder (e.g., corresponding to binder 124), where the particles form the structured major surface 777 of the structured layer 776. In some embodiments, an optical film includes an optically diffusive layer and a substrate disposed on the optically diffusive layer where the substrate has a structured major surface 777 opposite the optically diffusive layer.

In some embodiments, an optical film or stack of the present description includes an array of discrete spaced-apart optical bumps 779 formed on a major surface 777 of the optical film or stack. The optical bumps can have an average optical transmittance of greater than about 50% for each of the visible (e.g., λ1 to λ2) and infrared (e.g., λ3 to λ4) wavelength ranges for each of the first and second polarization states. The bumps can impart a surface roughness that lowers the coefficient of friction and eliminates or reduces damage to an adjacent film. In some embodiments, the optical bumps may be added to a substrate using a technique such as flexographic printing (or similar printing process) or via microreplication (e.g., casting and curing), for example. Related optical bumps are described in US provisional co-pending application 63/021,773 titled OPTICAL FILM WITH DISCONTINUOUS COATING and filed on May 8, 2020, and hereby incorporated herein by reference to the extent that it does not contradict the present description.

Figure 15B:
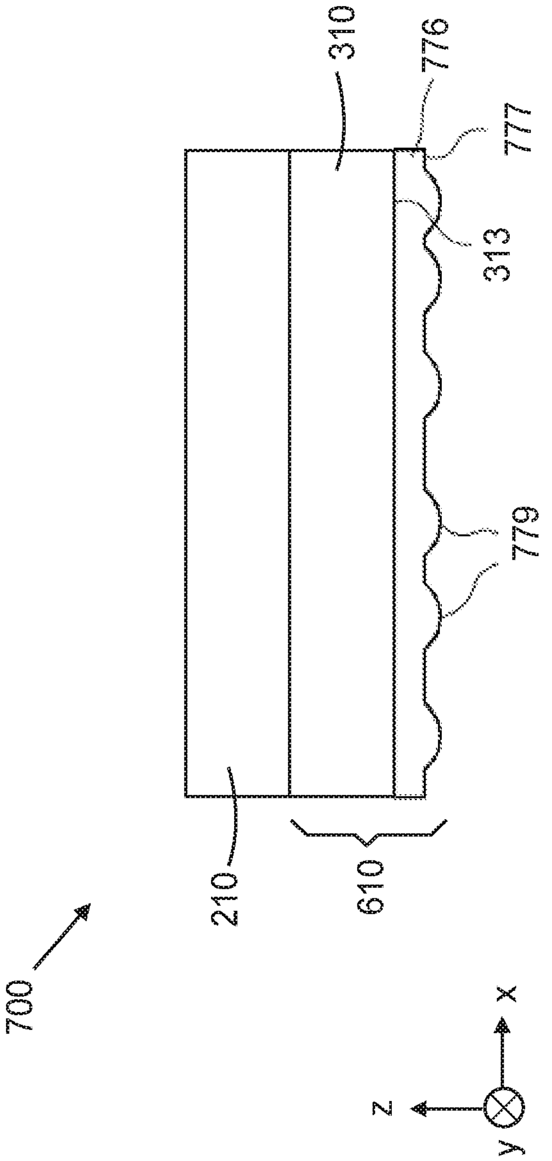
FIG. 15B is a schematic cross-sectional view of an optical film or stack having a structured major surface.

In some embodiments, an optical film or stack of the present description includes an optical layer 776 disposed on a major surface of the optical film or stack where the optical layer includes a structured major surface 777 to prevent wet-out with an adjacent film (wet-out in this context generally refers to the unintended integration of two surfaces in contact, leading to unwanted optical effects), for example. FIG. 15B is a schematic cross-sectional view of an optical film or stack 700 including an optically diffusive layer 210, a substrate 310 disposed on the optically diffusive layer 210, and an optical layer 776 disposed on the substrate 310 opposite the optically diffusive layer 210. The optical layer 776 is disposed on a major surface 313 of the substrate 310. The optical layer 776 includes a structured major surface 777 facing away from the substrate 310. The structured major surface 777 includes a plurality of spaced apart elongated structures 779 elongated along a same first direction (x-direction). The elongated structures can have a first average length along the first direction that is at least twice a second average length along an orthogonal second direction (y-direction) where the first and second directions are each orthogonal to the thickness direction (z-direction). The elongated structures 779 can be arranged at a substantially uniform density across the structured major surface (e.g., as illustrated in FIG. 15A). The optically diffusive layer 210 can correspond to any of the optically diffusive layers described elsewhere herein. The substrate 310 can correspond to any of the substrates described elsewhere herein.

In some embodiments, an optical film 700 includes an optically diffusive layer 210 and a substrate 610 disposed on the optically diffusive layer 210. In the illustrated embodiment, the substrate 610 includes the substrate 310 and the optical layer 776. In some embodiments, the substrate 310 and the optical layer 776 are formed of a same material so that there may be no discernable interface between the substrate 310 and the optical layer 776. In some embodiments, the substrate 610 is a unitary layer. The substrate 610 includes a structured major surface 777 facing away from the optically diffusive layer 210. The structured major surface 777 includes a plurality of spaced apart elongated structures elongated along a same first direction.

In some embodiments, the optical layer 776 or the substrate 610 may be formed from a process in which the elongated structures are molded into a material which passes over a tool (e.g., a roller drum with cuts or divots which act as molds for the material). Related structured optical layers are described in US provisional co-pending application 63/021,756 titled OPTICALLY DIFFUSIVE FILM WITH ELONGATED STRUCTURES and filed on May 8, 2020, and hereby incorporated herein by reference to the extent that it does not contradict the present description.

Figure 16:
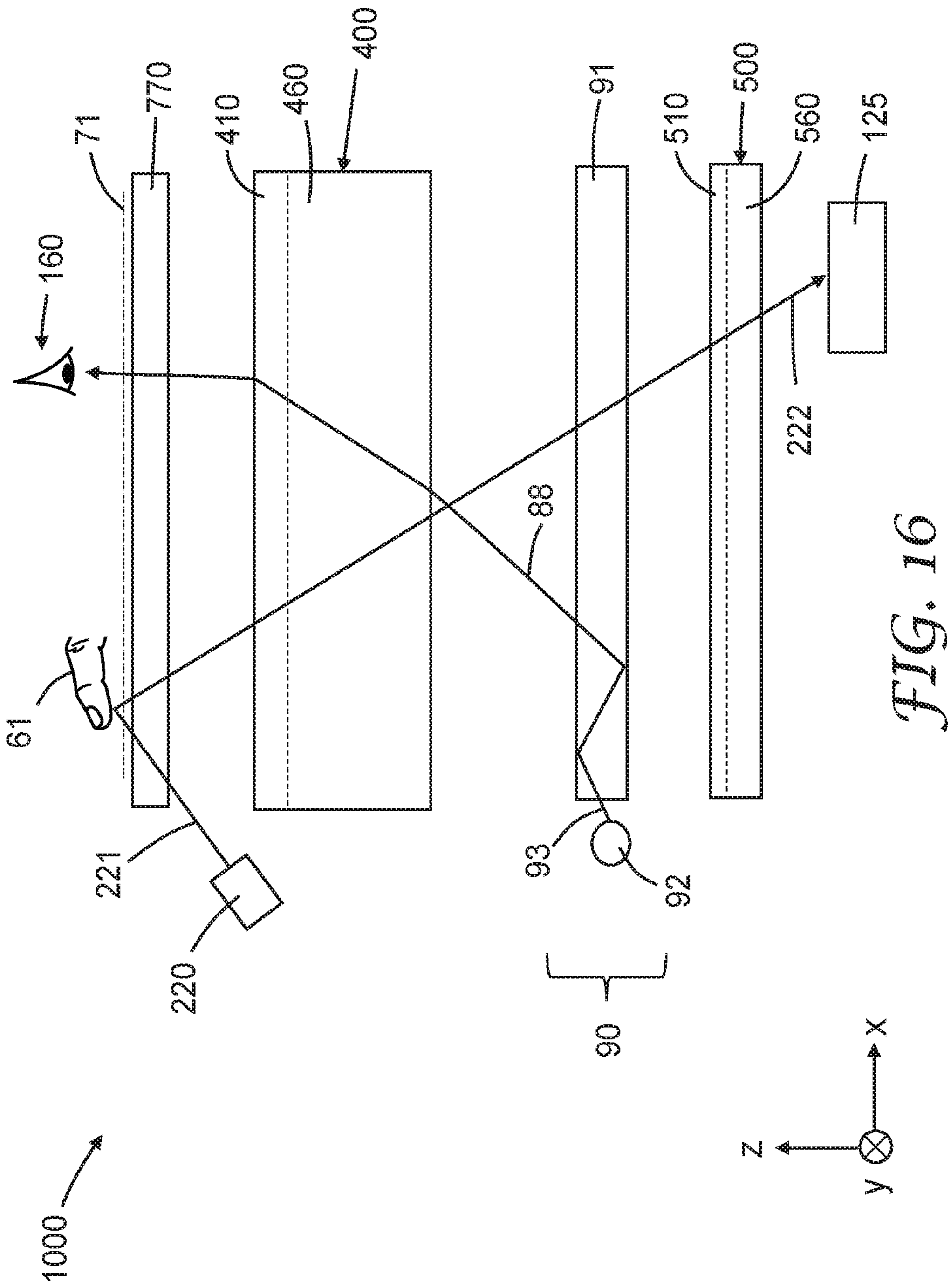
FIG. 16 is a schematic exploded cross-sectional view of an illustrative display system.

FIG. 16 is a schematic exploded cross-sectional view of a display system 1000 for sensing a finger 61 of a user 160 applied to the display system 1000. The display system 1000 includes a display panel 770 configured to generate an image 71 for viewing by the user 160; a lightguide 90 for providing illumination 88 to the display panel 770; an optical film or stack 400; a sensor 125 for sensing the finger 61 of the user 160 disposed proximate the lightguide 90 opposite the optical film or stack 400; an optical film or stack 500 disposed between the lightguide 90 and the sensor 125; and an infrared light source 220 configured to emit an infrared light 221 (directly or indirectly) toward the finger 61 of the user 160 where the sensor 125 is configured to receive at least a portion 222 of the infrared light 221 reflected by the finger 61. The infrared light source 220 can be disposed at any suitable location in the display system. For example, the infrared light source 220 can be disposed adjacent any the various layers of the display system. In some embodiments, the infrared light source 220 is disposed below a cover glass of the display system 1000. In some embodiments, the infrared light source 220 is disposed below the optical film or stack 500 (e.g., the infrared light source 220 can be disposed such that the optical film or stack 500 is between the lightguide 90 and the infrared light source 220).

The optical film or stack 400 is or includes a reflective polarizer and can correspond to any of the optical films or stack described herein that includes a reflective polarizer. In some embodiments, the optical film or stack 400 includes an optically diffusive layer 410 and a reflective polarizer 460. The optically diffusive layer 410 is disposed between the display panel 770 and the reflective polarizer 460. In some such embodiments, the optical film or stack 400 includes a second optically diffusive layer 10' or 10" (see FIGS. 2-3) such that the reflective polarizer is disposed between the optically diffusive layer 10 and the second optically diffusive layer 10' or 10". The optical film or stack 400 can correspond to optical film 100 or optical stack 200 or optical stack 200' with the optical film or stack oriented as indicated by the x-y-z coordinate systems of FIGS. 1A, 2, 3 and 16, for example. In some embodiments, the reflective polarizer is a collimating reflective polarizer as described further elsewhere herein.

The optical film or stack 500 includes an optical mirror 560 and can correspond to any of the optical films or stack described herein that includes an optical mirror. Optical film or stack 500 includes an optical layer 510 disposed on the optical mirror 560. In some embodiments the optical layer 510 corresponds to an optically diffuse layer described elsewhere. For example, the optical film or stack 500 can correspond to optical film 100 with the optically diffusive layer 10 facing the lightguide 90 and with the substrate 110 including an optical mirror. In some embodiments, the optical layer 510 corresponds to an optical layer including optical bumps as described elsewhere herein.

As described further elsewhere herein, in some embodiments, the reflective polarizer of the optical film or stack 400 is a collimating reflective polarizer that has a greater average optical transmittance for visible pass state light (e.g., p-polarized pass state light) incident at a smaller incident angle and a smaller average optical transmittance for the light incident at a greater incident angle. Such polarizers can provide a collimating effect by reflecting light having a greater incident angle back towards the optical film or stack 500 so that the light is recycled. In some embodiments, the optically diffusive layer 10' or 10" when included in the optical film or stack 400 scatters at least a portion of the light reflected from the reflective polarizer so that when the light is again incident on the reflective polarizer after reflecting from optical film or stack 500, at least a portion of the light has a lower incident angle. Liquid crystal displays (LCDs) often include brightness enhancing prism films (typically crossed prism films) to increase an on-axis brightness of the display. In some cases, such films can be omitted when a collimating reflective polarizer is included. In some embodiments of the display system 1000, there are no brightness enhancing prism films disposed between the display panel 770 and the optical film or stack 500.

In some embodiments, the lightguide 90 includes a lightguide plate 91 and at least one light source 92 configured to inject light 93 into the lightguide plate 91. In some embodiments, lightguide plate 91 extends in two orthogonal directions defining a plane (e.g., x-y plane) of the lightguide plate 91, and light (e.g., illumination 88) exiting the lightguide plate 91 propagates generally in a direction making an angle in a range of about 70 degrees or about 80 degrees to about 89 degrees with the plane of the lightguide plate 91. The angle can be about 85 degrees, for example.

The infrared light source 220 can have a peak emission wavelength of about 850 nm or about 940 nm, for example. The optical components (e.g., optical film or stack 400, lightguide plate 91, and optical film or stack 500) disposed between the finger 61 and the sensor 125 are preferably at least partially transmissive for the peak emission wavelength.

Related display systems including an optically diffusive layer are described in US provisional co-pending application 62/704,399 titled OPTICAL CONSTRUCTION AND DISPLAY SYSTEM INCLUDING SAME and filed on May 8, 2020, and hereby incorporated herein by reference to the extent that it does not contradict the present description. Other related display systems are described in US provisional co-pending application 63/021,760 titled DISPLAY SYSTEM WITH FINGER SENSING and filed on May 8, 2020, and hereby incorporated herein by reference to the extent that it does not contradict the present description, and in US provisional co-pending application 63/021,739 titled OPTICAL CONSTRUCTION AND DISPLAY SYSTEM and filed on May 8, 2020, and hereby incorporated herein by reference to the extent that it does not contradict the present description.

EXAMPLES

All parts, percentages, ratios, etc., in the examples and the rest of the specification are by weight, unless noted otherwise.

Materials

| Identification | Description | Source |
|---|---|---|
| A-174 | 3-methacryloxypropyl-trimethoxysilane | Momentive, Waterford, NY |
| 4H-2,2,2,6,6-TMP 1-O | 4-hydroxy-2,2,6,6-tetramethylpiperidine 1-oxyl | Sigma Aldrich, Milwaukee, WI |
| NALCO 2329 | 75 nm $SiO_2$ sol | Nalco Company, Naperville, IL |
| 1-methoxy-2-propanol | Solvent | Sigma Aldrich, Milwaukee, WI |
| SR444 | Pentaerythritol triacrylate monomer | Sartomer, Exton, PA |
| Isopropyl alcohol | Solvent | Sigma Aldrich, Milwaukee, WI |
| IRGACURE 184 | Photoinitiator | BASF, Vandalia, IL |
| IRGACURE 819 | Photoinitiator | BASF, Vandalia, IL |

Sample Preparation 1

A coating precursor solution was made. 5.95 grams of 3-methacryloxypropyl-trimethoxysilane (A-174, Momentive, Waterford, NY) and 0.5 gram of 4-hydroxy-2,2,6,6-tetramethylpiperidine 1-oxyl (5 wt. %; 4H-2,2,6,6-TMP 1-0, Sigma Aldrich, Milwaukee, WI) were added to the mixture of 400 grams 75 nm diameter Si02 sol (NALCO 2329, Nalco Company, Naperville, IL) and 450 grams of 1-methoxy-2-propanol (Sigma Aldrich, Milwaukee, WI) in a glass jar with stirring at room temperature for 10 minutes. The jar was sealed and placed in an oven at 80° C. for 16 hours. Then, the water was removed from the resultant solution with a rotary evaporator at 60° C. until the solid content of the solution was close to 45 wt. %. 200 grams of 1-methoxy-2-propanol was charged into the resultant solution, and then remaining water was removed by using the rotary evaporator at 60° C. This latter step was repeated for a second time to further remove water from the solution. Finally, the concentration of total SiO2 nanoparticles was adjusted to 42.5 wt. % by adding 1-methoxy-2-propanol to result in the SiO2 sol containing surface modified SiO2 nanoparticles with an average size of 75 nm.

A coating solution "A" was made. The coating solution "A" was composed of 27.98 wt. % of the clear precursor solution described above, 7.9 wt. % of pentaerythritol triacrylate monomer (SR444, Sartomer, Extron, PA), 63.3 wt. % isopropyl alcohol, 0.8 wt. % IRGACURE 184 (BASF, Vandalia, IL) and 0.02 wt. % IRGACURE 819 (BASF, Vandalia, IL). Coating solution "A" was pumped with a Viking CMD (Viking Pump, Cedar Falls, IA) pump to a slot-type coating die at a rate that produced a wet layer thickness of 15 microns onto a primed polyester substrate.

Next, the coating was polymerized by passing the coated substrate through a UV-LED cure chamber that included a quartz window to allow passage of UV radiation. The UV-LED cure chamber included a rectangular array of UV-LEDs. The LEDs (available from Nichia Inc., Tokyo Japan) operated at a nominal wavelength of 385 nm and when run at 10 Amps, resulted in a UV-A dose of 0.035 joules per square cm. The UV-LEDs were run at the current indicated in the tables below. The water-cooled UV-LED array was powered by a Genesys 150-22 power supply (available from TDK-Lambda, Neptune N.J.). The UV-LEDs were positioned above the quartz window of the cure chamber at approximately 2.5 cm from the substrate. The UV-LED cure chamber was supplied with a flow of nitrogen at a flow rate of 22 cubic feet per minute in order to keep the oxygen level below 50 parts ppm. The oxygen level in the UV-LED cure chamber was monitored using a Series 3000 oxygen analyzer (available from Alpha Omega Instruments, Cumberland RI).

After being polymerized by the UV-LEDs, the solvent in the cured coating was removed by transporting the coated substrate to a drying oven at 150° F. (66° C.) for 30 seconds. Next, the dried coating was post cured using a Fusion System Model 1600 configured with a H-bulb (available from Fusion UV Systems, Gaithersburg, MD.). The UV Fusion chamber was supplied with a flow of nitrogen that resulted in an oxygen concentration of approximately 50 ppm in the chamber. This resulted in the porous coated polyester film. Examples 1-6 were prepared using sample preparation 1.

Sample Preparation 2

A coating solution "B" was made. The coating solution "B" was composed of 42.22 wt. % of the clear precursor solution described in sample preparation 1, 11.96 wt. % of pentaerythritol triacrylate monomer (SR444, Sartomer), 45.50 wt. % isopropyl alcohol, 0.3 wt. % IRGACURE 184 and 0.01 wt. % IRGACURE 819. Coating solution B was pumped with a Viking CMD (Viking Pump, Cedar Falls IA) pump to a slot-type coating die at a rate that produced a wet layer thickness of 20 microns onto a primed polyester substrate using the same process described previously in sample preparation 1. Examples 7-14 were prepared using sample preparation 2.

Sample Preparation 3

Coating solution "B" from sample preparation 2 was pumped with a Viking CMD (Viking Pump, Cedar Falls IA)

pump to a slot-type coating die at a rate that produced a wet layer thickness of 7.75 microns onto a primed polyester substrate. The coating was processed as described in sample preparation 1. Examples 15-25 were prepared using sample preparation 3.

Sample Preparation 4

Coating solution "B" from sample preparation 2 was pumped with a Viking CMD (Viking Pump, Cedar Falls IA) pump to a slot-type coating die at a rate that produced a wet layer thickness of 7 microns onto a primed collimating multilayer optical film substrate. The coating was processed as described in sample preparation 1. Examples 26-31 were prepared using sample preparation 4.

Sample Preparation 5

The coating solution "C" was composed of 20.96 wt. % of the clear of the clear precursor solution described in sample preparation 1, 5.94 wt. % of pentaerythritol triacrylate monomer (SR444, Sartomer), 71.55 wt. % isopropyl alcohol, 1.48 wt. % IRGACURE 184 and 0.07 wt. % IRGACURE 819. Coating solution "C" was pumped with a Viking CMD (Viking Pump, Cedar Falls IA) pump to a slot-type coating die at a rate that produced a wet layer thickness of 6 microns onto a primed collimating multilayer optical film substrate. The coating was processed as described in sample preparation 1. Examples 32-36 were prepared using sample preparation 5.

Test Methods and Results

The total near-infrared transmission and diffuse near-infrared transmission were measured for each example using a spectrometer (ULTRASCAN PRO, Hunterlab, Reston, VA). The near-infrared scattering ratio was calculated from these measurements by dividing the diffuse near-infrared transmission by the total near-infrared transmission. Results are provided in the following table.

| Example | Sample preparation | UV LED Current (Amps) | 940 nm Total % T | 940 nm Diffuse % T | 940 nm Scatter Ratio (%) |
|---|---|---|---|---|---|
| 1 | 1 | 0 | 94.35 | 0.55 | 1 |
| 2 | 1 | 8 | 90.82 | 35.2 | 39 |
| 3 | 1 | 9 | 89.01 | 36.1 | 41 |
| 4 | 1 | 10 | 89.29 | 34.5 | 39 |
| 5 | 1 | 11 | 89 | 32.7 | 37 |
| 6 | 1 | 12 | 88.82 | 30.5 | 34 |
| 7 | 2 | 0 | 93.3 | 1.22 | 1 |
| 8 | 2 | 1 | 89.4 | 39.5 | 44 |
| 9 | 2 | 2 | 79.8 | 46.7 | 59 |
| 10 | 2 | 4 | 79.6 | 28.3 | 36 |
| 11 | 2 | 8 | 84.1 | 19.6 | 23 |
| 12 | 2 | 10 | 84.3 | 18.3 | 22 |
| 13 | 2 | 12 | 85.2 | 17.6 | 21 |
| 14 | 2 | 15 | 85.4 | 15.6 | 18 |
| 15 | 3 | 0 | 93.1 | 0.8 | 1 |
| 16 | 3 | 1 | 85.8 | 18.8 | 22 |
| 17 | 3 | 2 | 85.9 | 30.9 | 36 |
| 18 | 3 | 4 | 85.8 | 18.3 | 21 |
| 19 | 3 | 8 | 88.6 | 11.5 | 13 |
| 20 | 3 | 10 | 89.1 | 9.49 | 11 |
| 21 | 3 | 12 | 90.4 | 7.41 | 8 |
| 22 | 3 | 15 | 91.8 | 6.53 | 7 |
| 23 | 3 | 1 | 92.7 | 19.6 | 21 |
| 24 | 3 | 3 | 85 | 22.4 | 26 |
| 25 | 3 | 3.5 | 85.4 | 19.8 | 23 |
| 26 | 4 | 2 | 88.1 | 2.74 | 3 |
| 27 | 4 | 4 | 88.9 | 4.2 | 5 |
| 28 | 4 | 6 | 90.1 | 5.42 | 6 |
| 29 | 4 | 8 | 88.2 | 7.42 | 8 |
| 30 | 4 | 10 | 88.3 | 8.94 | 10 |
| 31 | 4 | 12 | 86.6 | 10.4 | 12 |
| 32 | 5 | 3 | 87.21 | 11.5 | 13 |
| 33 | 5 | 4 | 85.97 | 13.7 | 16 |
| 34 | 5 | 5 | 89.49 | 14.65 | 17 |
| 35 | 5 | 6 | 88.73 | 14.81 | 17 |
| 36 | 5 | 7 | 90.18 | 14.29 | 16 |

The visible transmission (% T), haze (% H) and clarity (% C) were measured for each example using a haze meter (Haze-gard Plus, BYK-Gardner, Columbia, MD). Results are provided in the following table.

| Example | Sample preparation | UV LED Current (Amps) | % T | % H | % C |
|---|---|---|---|---|---|
| 1 | 1 | 0 | 94.4 | 0.4 | 98.8 |
| 2 | 1 | 8 | 87.5 | 80.4 | 97.8 |
| 3 | 1 | 9 | 85.9 | 83.9 | 97.6 |
| 4 | 1 | 10 | 84.4 | 84.4 | 98.1 |
| 5 | 1 | 11 | 83.5 | 84.2 | 98.1 |
| 6 | 1 | 12 | 82 | 84 | 98.5 |
| 7 | 2 | 0 | 94 | 0.95 | 99 |
| 8 | 2 | 1 | 90 | 78.3 | 91 |
| 9 | 2 | 2 | 69 | 98.7 | 93 |
| 10 | 2 | 4 | 59 | 94.6 | 98 |
| 11 | 2 | 8 | 59 | 88.2 | 98 |
| 12 | 2 | 10 | 60 | 85.7 | 98 |
| 13 | 2 | 12 | 60 | 83.8 | 98 |
| 14 | 2 | 15 | 61 | 81.4 | 99 |
| 15 | 3 | 0 | 1.02 | 94 | 99 |
| 16 | 3 | 1 | 52.7 | 93 | 99 |
| 17 | 3 | 2 | 79.1 | 78 | 99 |
| 18 | 3 | 4 | 80.2 | 70 | 99 |
| 19 | 3 | 8 | 66.7 | 71 | 99 |
| 20 | 3 | 10 | 57.6 | 73 | 99 |
| 21 | 3 | 12 | 55.2 | 74 | 99 |
| 22 | 3 | 15 | 47.5 | 76 | 100 |
| 23 | 3 | 1 | 52.6 | 60 | 100 |
| 24 | 3 | 3 | 83.9 | 72 | 99 |
| 25 | 3 | 3.5 | 82 | 71 | 99 |
| 26 | 4 | 2 | 27 | 8.83 | 96 |
| 27 | 4 | 4 | 29 | 14 | 96 |
| 28 | 4 | 6 | 29 | 18.8 | 97 |
| 29 | 4 | 8 | 29 | 24.8 | 97 |
| 30 | 4 | 10 | 27 | 34.1 | 97 |
| 31 | 4 | 12 | 30 | 39.9 | 96 |
| 32 | 5 | 3 | 32 | 32.7 | 93.7 |
| 33 | 5 | 4 | 31.8 | 47.1 | 93.6 |
| 34 | 5 | 5 | 31.9 | 51.6 | 93.5 |
| 35 | 5 | 6 | 31.5 | 53.3 | 93.7 |
| 36 | 5 | 7 | 31.3 | 53.9 | 93.8 |

Cross-sectional images of various diffuser samples were acquired by cutting the diffuser films using micro-tome. SEM cross-section images were first converted into 8-bit using National Institute of Health ImageJ software. ImageJ software was used to select the area of interest. The software was used to adjust the threshold until the area of the image below threshold was approximately same as the area below the front plane of the image. The software automatically calculated the area below threshold. The ratio of the area below threshold and the total area of the image was used as void fraction. Results are provided in the following table.

| Example | Total Area | Area Below Threshold | % Area | Min Thr. | Max Thr. |
|---|---|---|---|---|---|
| 21 | 301644 | 106656 | 35.4 | 0 | 103 |
| 23 | 419739 | 148224 | 35.3 | 0 | 105 |
| 24 | 296172 | 90740 | 30.6 | 0 | 104 |
| 25 | 311606 | 83479 | 26.8 | 0 | 109 |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical film comprising an optically diffusive layer comprising:

opposing first and second major surfaces;

a plurality of nanoparticles dispersed between and across the first and second major surfaces, the nanoparticles comprising silica; and a polymeric material bonding the nanoparticles to each other to form a plurality of nanoparticle aggregates defining a plurality of voids therebetween, such that in a plane of a cross-section of the optically diffusive layer in a thickness direction of the optically diffusive layer:

the nanoparticles have an average size between about 20 nm and about 150 nm;

an average size of the nanoparticle aggregates is between about 100 nm and about 1000 nm; and the voids occupy from about 5% to about 50% of an area of the plane of the cross-section, wherein, for substantially normally incident light and a visible wavelength range from about 450 nm to about 650 nm and an infrared wavelength range from about 930 nm to about 970 nm:

in the visible wavelength range, the optical film has an average specular transmittance Vs; and in the infrared wavelength range, the optical film has an average total transmittance It and an average specular transmittance Is, $Is/It \geq 0.6$, $Is/Vs \geq 2.5$; and wherein, bending the optical film at a first bend location over an inner diameter of at most 10 mm results in no, or very little, damage to the optically diffusive layer at the first bend location, wherein the optical film further comprises a substrate disposed on the optically diffusive layer, and a structured layer disposed between the substrate and the optically diffusive layer, the structured layer comprising a structured first major surface facing the optically diffusive layer and an opposite second major surface facing the substrate, the first and second major surfaces of the optically diffusive layer substantially conforming to the structured first major surface of the structured layer, and wherein the structured layer comprises a plurality of particles dispersed in a binder, the particles forming the structured first major surface of the structured layer.

2. The optical film of claim 1, wherein the plurality of nanoparticles has a nanoparticle size distribution comprising a first peak at a first nanoparticle size from about 5 nm to about 40 nm and a second peak at a second nanoparticle size from about 50 nm to about 100 nm.

3. The optical film of claim 1, wherein in the plane of the cross-section of the optically diffusive layer in the thickness direction of the optically diffusive layer, the voids occupy from about 5% to about 45% of the area of the plane of the cross-section.

4. The optical film of claim 1, wherein the substrate comprises one or more of polyethylene terephthalate (PET), polycarbonate, polymethylmethacrylate (PMMA), polyvinyl chloride (PVC), polyvinyl alcohol (PVA), polyolefin, polyethylene, polyethylene naphthalate, cellulose acetate, polystyrene, and polyimide.

5. The optical film of claim 1, wherein the substrate comprises a plurality of alternating first and second polymeric layers numbering at least 20 in total, wherein an average thickness of each of the first and second polymeric layers is less than about 350 nm.

6. The optical film of claim 5, wherein the substrate comprises a reflective polarizer, wherein the reflective polarizer transmits at least 40% of the incident light for a first polarization state for each wavelength in the visible wavelength range, reflects at least 70% of the incident light for an orthogonal second polarization state for each wavelength in the visible wavelength range, and transmits at least 40% of the incident light for each of the first and second polarization states for each wavelength in the infrared wavelength range, and wherein for the first polarization state and the visible wavelength range, the reflective polarizer has a greater average optical transmittance for light incident at a smaller incident angle and a smaller average optical transmittance for light incident at a greater incident angle.

7. The optical film of claim 1, wherein the substrate comprises an absorbing polarizer, such that for substantially normally incident light and a predetermined wavelength range, the absorbing polarizer has an average optical transmittance of at least 40% for a first polarization state and an average optical absorption of at least 60% for an orthogonal second polarization state.

8. The optical film of claim 1, wherein the substrate comprises an optical mirror, such that for substantially normally incident light and a predetermined wavelength range, the optical mirror has an average optical reflectance of at least 60% for each of mutually orthogonal first and second polarization states.

9. The optical film of claim 1, wherein the substrate comprises a structured major surface facing away from the optically diffusive layer, the structured major surface comprising a plurality of spaced apart elongated structures elongated along a same first direction.

10. An optical stack comprising a reflective polarizer disposed between first and second optically diffusive layers, each of the first and second optically diffusive layers comprising a plurality of non-uniformly dispersed particles defining a plurality of voids therein, such that for substantially normally incident light and a visible wavelength range from about 450 nm to about 650 nm and an infrared wavelength range from about 930 nm to about 970 nm:

the reflective polarizer transmits at least 40% of the incident light for a first polarization state for each wavelength in the visible wavelength range, reflects at least 70% of the incident light for an orthogonal second polarization state for each wavelength in the visible wavelength range, and transmits at least 40% of the incident light for each of the first and second polarization states for each wavelength in the infrared wavelength range, wherein for the first polarization state, the reflective polarizer has a greater average optical transmittance for light incident at a smaller incident angle and a smaller average optical transmittance for light incident at a greater incident angle; and in the visible wavelength range, each of the first and second optically diffusive layers has an average total transmittance Vt and an average specular transmittance Vs, and in the infrared wavelength range, each of the first and second optically diffusive layers has an average total transmittance It and an average specular transmittance Is, $Is/It \geq 0.6$, and $Is/Vs \geq 2.5$.

11. The optical stack of claim 10, wherein one of the first and second optically diffusive layers is directly coated on the reflective polarizer, and the reflective polarizer and the other one of the first and second optically diffusive layers define an air gap therebetween.

12. The optical stack of claim 10, wherein $1 < It/Vt < 2.5$ for the one of the first and second optically diffusive layers, and wherein $2.5 < It/Vt < 4$ for the other one of the first and second optically diffusive layers.

13. The optical stack of claim 10, wherein for at least one of the first and second optically diffusive layers, the particles in the plurality of non-uniformly dispersed particles form a plurality of particle aggregates defining a plurality of voids therebetween, such that in a plane of a cross-section of the optically diffusive layer in a thickness direction of the optically diffusive layer:

an average size of the particle aggregates is between about 5 microns and about 10 microns; and the voids occupy from about 5% to about 50% of an area of the plane of the cross-section.

* * * * *